(12) United States Patent
Deane et al.

(10) Patent No.: US 10,119,592 B2
(45) Date of Patent: Nov. 6, 2018

(54) VEHICLE DRIVETRAIN WITH ACTIVE MAGNETIC BEARINGS

(71) Applicant: Elwha LLC, Bellevue, WA (US)

(72) Inventors: Geoffrey F. Deane, Bellevue, WA (US); Philip A. Eckhoff, Kirkland, WA (US); Bran Ferren, Beverly Hills, CA (US); William Gates, Medina, WA (US); W. Daniel Hillis, Encino, CA (US); Roderick A. Hyde, Redmond, WA (US); Muriel Y. Ishikawa, Livermore, CA (US); Edward K. Y. Jung, Bellevue, WA (US); Jordin T. Kare, San Jose, CA (US); John Latham, Boulder, CO (US); Nathan P. Myhrvold, Medina, WA (US); Robert C. Petroski, Seattle, WA (US); Clarence T. Tegreene, Mercer Island, WA (US); David B. Tuckerman, Lafaytte, CA (US); Thomas A. Weaver, San Mateo, CA (US); Charles Whitmer, North Bend, WA (US); Lowell L. Wood, Jr., Bellevue, WA (US); Victoria Y. H. Wood, Livermore, CA (US)

(73) Assignee: Elwha LLC, Bellevue, WA (US)

( * ) Notice: Subject to any disclaimer, the term of this patent is extended or adjusted under 35 U.S.C. 154(b) by 0 days.

(21) Appl. No.: 14/641,084

(22) Filed: Mar. 6, 2015

(65) Prior Publication Data
US 2016/0258506 A1 Sep. 8, 2016

(51) Int. Cl.
*F16C 32/04* (2006.01)
*F16C 39/06* (2006.01)
(Continued)

(52) U.S. Cl.
CPC .......... *F16F 15/03* (2013.01); *F16C 32/0402* (2013.01); *F16C 32/044* (2013.01);
(Continued)

(58) Field of Classification Search
CPC F16C 32/044; F16C 32/0402; F16C 32/0408; F16C 32/0423; F16C 32/0425;
(Continued)

(56) References Cited

U.S. PATENT DOCUMENTS

| | | | | |
|---|---|---|---|---|
| 3,500,827 A | * | 3/1970 | Myers | A61G 10/023 128/202.26 |
| 5,894,181 A | * | 4/1999 | Imlach | F16C 32/0429 310/90.5 |
| 5,977,677 A | * | 11/1999 | Henry | F01D 25/164 310/90 |
| 6,304,015 B1 | * | 10/2001 | Filatov | F16C 32/0436 310/90.5 |
| 6,324,828 B1 | * | 12/2001 | Willis | F02C 3/08 60/39.23 |
| 7,147,583 B2 | | 12/2006 | Lemanski | |

(Continued)

FOREIGN PATENT DOCUMENTS

DE 2342767 A1 * 3/1975
JP 07054846 A * 2/1995
(Continued)

OTHER PUBLICATIONS

Lembke, Torbjorn A., "Design and Analysis of a Novel Low Loss Homopolar Electrodynamic Bearing", Department of Electrical Engineering Royal Institute of Technology, Sweden 2005, 212 pages.

*Primary Examiner* — Keith J Frisby
(74) *Attorney, Agent, or Firm* — Foley & Lardner LLP

(57) ABSTRACT

A vehicle drivetrain includes a magnetic bearing. The vehicle drivetrain includes a motor configured to provide a rotational driving force. The rotational driving force is received by a shaft, and the magnetic bearing is configured to support the shaft. The shaft is configured to drive a wheel of the vehicle.

19 Claims, 13 Drawing Sheets

(51) Int. Cl.
- *F16F 15/03* (2006.01)
- *F16F 15/00* (2006.01)
- *F16D 1/10* (2006.01)
- *F16D 3/06* (2006.01)

(52) U.S. Cl.
CPC ...... *F16C 32/0408* (2013.01); *F16C 32/0425* (2013.01); *F16C 32/0442* (2013.01); *F16C 32/0444* (2013.01); *F16C 39/06* (2013.01); *F16C 39/066* (2013.01); *F16F 15/002* (2013.01); *F16D 1/10* (2013.01); *F16D 3/06* (2013.01); *F16D 2001/103* (2013.01)

(58) Field of Classification Search
CPC .. F16C 32/0442; F16C 32/0444; F16C 32/04; F16C 39/06; F16C 39/063; F16C 39/066
See application file for complete search history.

(56) References Cited

U.S. PATENT DOCUMENTS

| | | | |
|---|---|---|---|
| 2009/0236813 A1* | 9/2009 | Reid | B62D 7/18 |
| | | | 280/93.512 |
| 2011/0200282 A1* | 8/2011 | Shinohara | B60K 17/046 |
| | | | 384/462 |
| 2014/0259636 A1* | 9/2014 | Salmia | H02K 7/09 |
| | | | 29/598 |

FOREIGN PATENT DOCUMENTS

| | | |
|---|---|---|
| RU | 2549736 C1 * | 4/2015 |
| RU | 2549736 C1 * | 4/2015 |

* cited by examiner

VEHICLE DRIVETRAIN WITH ACTIVE MAGNETIC BEARINGS

BACKGROUND

Vehicle drivetrain components, such as motors and drive shafts, may be limited in performance or design as a result of related components such as bearings. Motor weight and drive shaft weight may be reduced in a vehicle through the use of electric motors and lightweight hollow drive shafts. The rotational speed of the hollow drive shaft and speed of the electric motor may be limited by bearing performance of the bearings used to support the drive shafts.

SUMMARY

One embodiment relates to a vehicle drivetrain including a magnetic bearing. The vehicle drivetrain includes a motor configured to provide a rotational driving force. The rotational driving force is received by a shaft, and the magnetic bearing is configured to support the shaft.

Another embodiment relates to a vehicle drivetrain including a motor configured to provide a rotational driving force and a shaft configured to receive the rotational driving force from the motor. A magnetic bearing is configured to selectively support the shaft, and a mechanical bearing is configured to selectively support the shaft. The vehicle drivetrain further includes a control circuit configured to transition support of the shaft from the mechanical bearing to the magnetic bearing when the control circuit determines that a threshold condition is satisfied.

Another embodiment relates to a vehicle drivetrain including a single motor configured to provide a rotational driving force with a drive shaft configured to receive the rotational driving force from the motor. A differential is driven by the drive shaft. The vehicle drivetrain further includes a first and a second half shaft, wherein at least one of the first or second half shafts are configured to be driven by the differential. A magnetic bearing supports at least one of the drive shaft, the first half shaft, or the second half shaft.

Another embodiment relates to a vehicle drivetrain including a plurality of drive mechanisms, each drive mechanism including a motor configured to provide a rotational driving force and a shaft configured to receive the rotational driving force from the motor. Each drive mechanism further includes a magnetic bearing configured to support the shaft.

Another embodiment relates to a method for supporting a shaft of a vehicle drivetrain. The method includes supporting the shaft using a mechanical bearing in contact with the shaft and activating an active magnetic bearing using a control circuit. The method further includes controlling one or more electromagnets of the magnetic bearing and using the control circuit to center the shaft within the active magnetic bearing. The shaft is centered within the mechanical bearing when centered within the active magnetic bearing, and when centered, the shaft does not contact the mechanical bearing.

Another embodiment relates to a method for supporting a shaft of a vehicle drivetrain. The method includes supporting the shaft using a mechanical bearing in contact with a portion of the shaft and positioning the shaft, using a positioning system, such that the portion of the shaft is no longer in contact with the mechanical bearing and no portion of the shaft is in contact with the mechanical bearing. The shaft is then supported with a magnetic bearing.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1A:
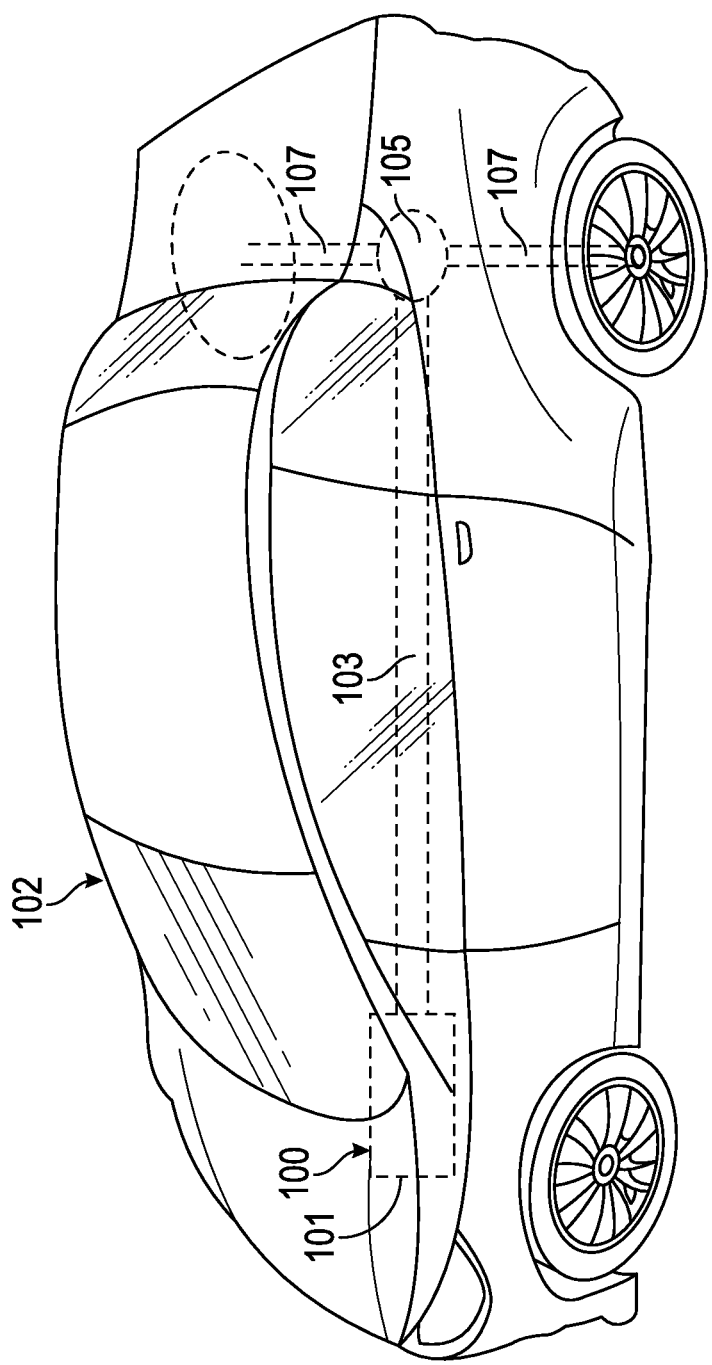
FIG. 1A is an illustration of a vehicle with a vehicle drivetrain according to one embodiment.

Referring generally to the figures, vehicle drivetrain 100 may include one or more magnetic bearings 300. Magnetic bearings 300 may be used in conjunction with other magnetic and/or mechanical drivetrain components. Advantageously, magnetic bearings 300 may provide support to one or more components (e.g. drive shaft 103, half shaft 107, etc.) while reducing wear and bearing friction losses. The component may be supported without the mechanical friction generated by a mechanical bearing (e.g., friction between a rotating shaft and a roller bearing or other rolling element). Magnetic bearings 300 may therefore reduce drivetrain maintenance by reducing or eliminating maintenance resulting from mechanical bearings (e.g., replacing and/or lubricating mechanical bearings).

Magnetic bearings 300 may provide a further advantage in that magnetic bearings may be used in conjunction with high-speed motors (e.g., electric motor 101) and/or lightweight hollow drive shafts. High speed motors and/or lightweight hollow drive shafts may be limited by the performance of mechanical bearings. For example, an increased speed and/or number of revolutions of a shaft may decrease the life of a mechanical bearing by increasing the number of cycles of operation. Replacing a mechanical bearing with magnetic bearing 300 may reduce or eliminate these negative performance characteristics of mechanical bearings. Thus, magnetic bearings 300 may allow the use of high-speed motors and/or lightweight hollow drive shafts in vehicle drivetrain 100. In some embodiments, the drive shafts and/or other shafts of vehicle drive train 100 which transmit power may be made of or include carbon fiber and/or other composites. This may allow the shaft to remain light weight yet have a high stiffness which prevents bowing of the shaft during high speed rotation (e.g., high speed rotation due to being driven by a high speed electric motor).

Referring now to FIG. 1A, vehicle drivetrain 100 is illustrated according to one embodiment. Vehicle drivetrain 100 may be any combination of mechanical, magnetic, electrical, and/or other components for providing power (e.g., motive force) for use by a vehicle. In one embodiment, vehicle drivetrain 100 is a drivetrain for automobile 102 (e.g., car, truck, bus, etc.). Vehicle drivetrain 100 may include components such as motor 101, drive shaft 103, differential 105, half shafts 107, and/or other components. In other embodiments, vehicle drivetrain 100 is a drivetrain for other vehicles such as watercraft, aircraft, and/or other vehicles. In such embodiments, power from electric motor 101 may be delivered to propulsion devices other than wheels 109. For example, vehicle drivetrain 100 may deliver power to a propeller, prop, and/or other propulsion component.

Figure 1B:
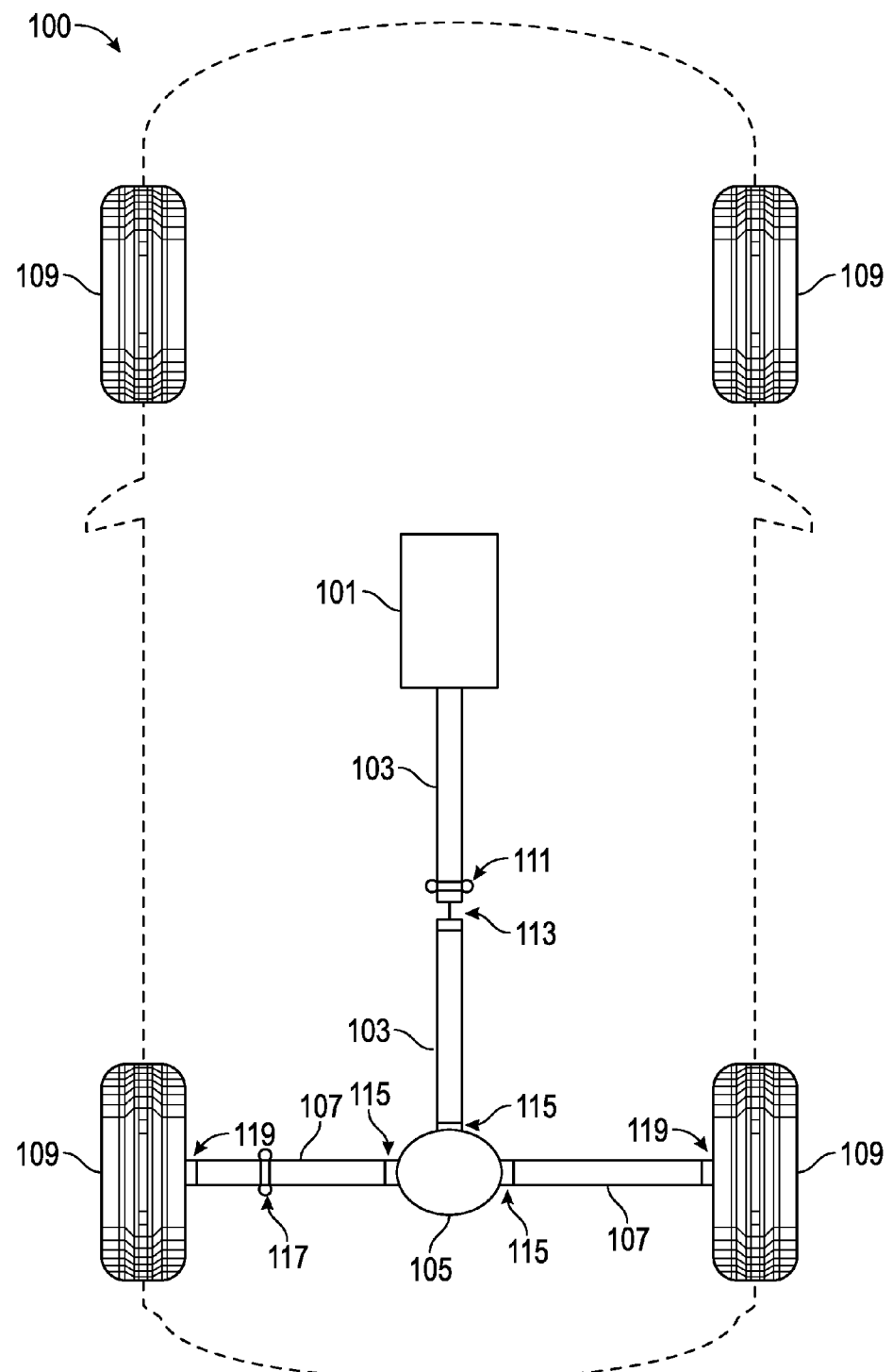
FIG. 1B is an illustration of a vehicle drivetrain having a rear wheel drive configuration and magnetic bearings according to one embodiment.

Referring to FIG. 1B, electric motor 101 may provide power used to drive shaft 103. Motor 101 is an electric motor in some embodiments. For example, motor 101 may be a direct current electric motor, alternating current electric motor, brushless electric motor, brushed electric motor, and/or other electric motors. In an alternative embodiment, motor 101 is an internal combustion engine. For example, motor 101 may be a reciprocating internal combustion engine (e.g., two stroke engine, four stroke engine, diesel engine, etc.), rotary internal combustion engine, or continuous combustion engine (e.g., a gas turbine). Drive shaft 103, driven by motor 101, may provide power to wheels 109 directly or through intermediate components. In one embodiment, drive shaft 103 serves as an input to differential 105. Differential 105 may in turn provide transfer rotation from drive shaft 103 to one or more of half shafts 107. Half shafts 107 may in turn drive wheels 109. Through vehicle drivetrain 100, electric motor 101 may drive one or more wheels 109 of a vehicle in order to drive the vehicle.

A plurality of bearings may be used to support components of vehicle drivetrain 100 and/or facilitate the coupling of one or more components. As described herein, bearings may include one or more mechanical bearings, one or more magnetic bearings, and/or a combination of mechanical and magnetic bearings. Mechanical bearings may be any mechanical bearing configured to allow rotation of a shaft within a stationary component (e.g., a ball bearing). For example, a mechanical bearing may be a rolling element bearing which includes balls or rollers which contact the shaft and a housing of the mechanical bearing. The rolling elements may roll or rotate to minimize friction between the shaft and the bearing. Mechanical bearings may have a variety of configurations including those discussed with reference to FIGS. 4-5C. Magnetic bearings may be any bearing which uses magnetic fields and/or magnetic forces to prevent or reduce friction between a shaft and the magnetic bearing. Magnetic bearings can levitate a shaft within the bearing using magnetic fields produced by electromagnets and/or permanent magnets. Magnetic bearings may have a variety of configurations including those discussed with reference to FIGS. 3A-3C. Combinations of both magnetic bearings and mechanical bearings may be used to support components of drivetrain 100. For example, mechanical and magnetic components can be used to support components of vehicle drivetrain 100 as discussed with reference to FIGS. 4-6. A bearing (e.g., a mechanical bearing, a magnetic bearing, or a combination of mechanical and magnetic bearings) includes a flange or other surface which allows the bearing to be mounted to a fixed portion of vehicle 102. This allows for the bearing to be held stationary and to support the shaft within the bearing.

Still referring to FIG. 1B, one or more bearings may be used to support various components of vehicle drivetrain 100. For example, drive shaft 103 may be supported by one or more bearings 111. Bearings 111 may be mechanical and/or magnetic bearings 300. Bearings 111 may support a portion of drive shaft 103 such drive shaft 103 functions in tandem with coupling 113. A first portion of drive shaft 103 is supported while a second portion of drive shaft 103 is allowed to move via the connection to the first portion by coupling 113. Bearings 111 may include a flange and/or other component which allows bearings 111 to be coupled to a structure of the vehicle. This allows bearings 111 to support drive shaft 103 while drive shaft 103 is free to rotate within bearings 111. In further embodiments, mechanical bearings and/or magnetic bearings 300 are used for motor bearings in motor 101. In still further embodiments, motor bearings in motor 101 are a combination of mechanical bearings and magnetic bearings 300.

Coupling 113 allows for flexure and/or changes in direction or position of drive shaft 103. This allows drive shaft 103 to continue to provide rotational force to other components of vehicle drivetrain 100 while various components of vehicle drivetrain 100 move relative to one another (e.g., due to suspension travel). Coupling 113 may be mechanical and/or magnetic. For example, coupling 113 may be a universal joint. In other embodiments, coupling 113 may be other types of flex joints. For example, coupling 113 may be a flexural coupling, a bellows coupling, helical coupling, etc. The coupling 113 type may be any type of coupling suitable for high speed, low torque applications. Advantageously, a coupling 113 suitable for high speed, low torque applications may be more suitable for use in vehicle drive train 100 having high speed electric motor 101 and/or shafts which rotate at higher speed than conventional components in conventional vehicle drivetrains. The low torque transmitted by drivetrain 100 may increase the number and/or types of couplings 113 which may be used in vehicle drivetrain 100 as coupling 113 may transmit less torque than couplings in conventional vehicle drivetrains.

Bearings 115 support shafts at differential 105 and/or couple shafts to differential 105. Bearings 115 may be mechanical and/or magnetic bearings 300 (as described with reference to FIGS. 3A-5). Drive shaft 103 may enter differential 105 to provide mechanical rotation to differential 105.

Drive shaft 103 may be secured through an opening of differential 105 using bearings 115. Differential 105 may transmit rotation from drive shaft 103 to one or more half shafts 107. Differential 105 may allow half shafts 107 to rotate at different speeds. Differential 105 may be mechanical, electronically controlled limited slip differential, a limited slip differential, magnetic differential, and/or other system which transmits input from drive shaft 103 to half shafts 107. Differential 105 may be a simple differential, limited slip differential, a transaxle, or other type of differential. Differential 105 may be or include conventional gears, magnetic gearing, rollers, belts, or other components for transmitting rotational motion. It should be noted that the high speed, low torque configuration of drivetrain 100 may increase the options available for transmitting input power from drive shaft 103 to half shafts 107. Half shafts 107 exit from differential 105 towards wheels 109. Half shafts 107 may be supported at and/or coupled to differential 105 with bearings 115 (e.g., mechanical and/or magnetic bearings 300).

In some embodiments, half shafts 107 are supported by one or more bearings 117. Bearings 117 may be mechanical and/or magnetic bearings 300. Bearings 117 may include flanges and/or other components which allow bearings 117 to be secured to a vehicle structure or other component. This allows bearings 117 to support half shafts 107 while allowing half shafts 107 to rotate freely within bearings 117. In one embodiment, half shafts 107 are supported by bearings at two or more locations. For example, half shafts 107 may be supported at differential 105 by bearings 115 and supported at an additional location by bearings 117. In alternative embodiments, half shafts 107 are supported between differential 105 and wheels 109 by two or more bearings 117. In alternative embodiments, various numbers and configurations of bearings (mechanical and/or magnetic bearings 300) are used.

Half shafts 107 drive one or more wheels 109. Half shafts 107 are coupled to wheels 109. Half shafts 107 may be coupled to wheels 109 directly or through intermediate components. For example, half shafts 107 may be coupled to wheels 109 using one or more couplings 113 such as constant velocity joints. Half shafts 107 may include a splined portion which allows half shafts 107 to move relative to wheels 109. In other embodiments, half shafts 107 and/or other shafts of vehicle drivetrain 100 include other variable-length structures such as bellows, magnetic couplers, etc. Wheels 109 may be coupled to a supporting structure (e.g., suspension components, steering knuckle, hub carrier, etc.) with a wheel hub assembly. The wheel hub assembly may further couple wheel 109 to half shaft 107. For example, the wheel hub assembly may include grooves or notches which accept a splined portion of half shaft 107. The wheel hub may include one or more bearings 119 which allow wheel 109 and the wheel hub to rotate relative to a suspension component or other substantially stationary structure to which the wheel hub is connected. Bearings 119 further allow for wheel 109 to be rotationally driven by half shaft 107. Bearings 119 may be one or mechanical bearings and/or magnetic bearings 300.

In some embodiments, bearings 119 are mechanical bearings and are used to support the weight of the vehicle and/or vehicle drivetrain 100. The weight of the vehicle and/or vehicle drivetrain 100 is transferred to wheels 109 through bearings 119. Mechanical bearings may be better suited to transferring the weight of the vehicle and/or vehicle drivetrain 100 in comparison to magnetic bearings 300. Advantageously, the use of mechanical bearings 119 to support the weight of vehicle 102 allows for the use of magnetic bearings 300 to support half shaft 107. Magnetic bearings 300 need not support the weight of vehicle 102. Magnetic bearings 300 may support the weight of half shafts 107. Furthermore, magnetic bearings 300 may be used as bearings 111 to support drive shaft 103. Magnetic bearing 300 need not support the weight of the vehicle and therefore may be used to support and/or stabilize other components of vehicle drivetrain 100. This may allow for the use of high speed electric motors 101 and hollow shafts (e.g., hollow drive shaft 103, hollow half shafts 107, and/or other hollow shafts).

In some embodiments, vehicle drivetrain 100 may further include reduction gearing. The reduction gearing may be used to increase torque, reduce rotational speed, and/or otherwise modify a rotational input (e.g., from drive shaft 103, half shafts 107, and/or other shafts). In one embodiment, reduction gearing is included in one or more wheels 109 and/or wheel hub assemblies. Advantageously, reduction gearing may be used in conjunction with one or more high speed motors 101 and/or hollow shafts (e.g., drive shaft 103, half shafts 107, etc.). The reduction gearing takes a high speed input from a high speed motor 101 (e.g., an electric motor) and/or shaft (e.g., a hollow or solid shaft, drive shaft 103, half shaft 107, and/or other shaft) and reduces the rotational speed of the input for use in driving wheels 109.

In one embodiment, the reduction gearing is mechanical. For example, the reduction gearing may include planetary gears, sun gears, and/or other gears. The reduction gearing may be a high-ratio mechanical reduction gear. For example, the reduction gearing may be a harmonic drive gear set or strain wave gear system. In alternative embodiments, the reduction gearing is or includes magnetic reduction gearing. For example, a system of magnets may be used to reduce input speed while driving wheels 109. The use of magnetic gearing including magnetic reduction gearing is described in more detail with reference to FIG. 9. Reduction gearing may also include other types of speed-reducing mechanisms such as belt drives, planetary roller drives, planetary gears, etc.

Still referring to FIG. 1A, vehicle drivetrain 100 is illustrated according to a rear wheel drive embodiment having a single motor 101. In alternative embodiments, alternative configurations are possible. For example, vehicle drive train 100 may be rear wheel drive and include a plurality of motors 101 (e.g., an electric motor 101 which drives each rear wheel 109). In further embodiments, vehicle drivetrain 100 is front wheel drive. A single motor 101 or plurality of motors 101 may be used in various embodiments. In further alternative embodiments, vehicle drivetrain 100 is an all-wheel drive system. Each wheel 109 may be driven by a separate motor 101. Alternatively, a plurality of wheels 109 may be driven by one motor 101 using further components such as a transfer box. In still further embodiments, vehicle drivetrain 100 has alternative configurations.

Figure 1C:
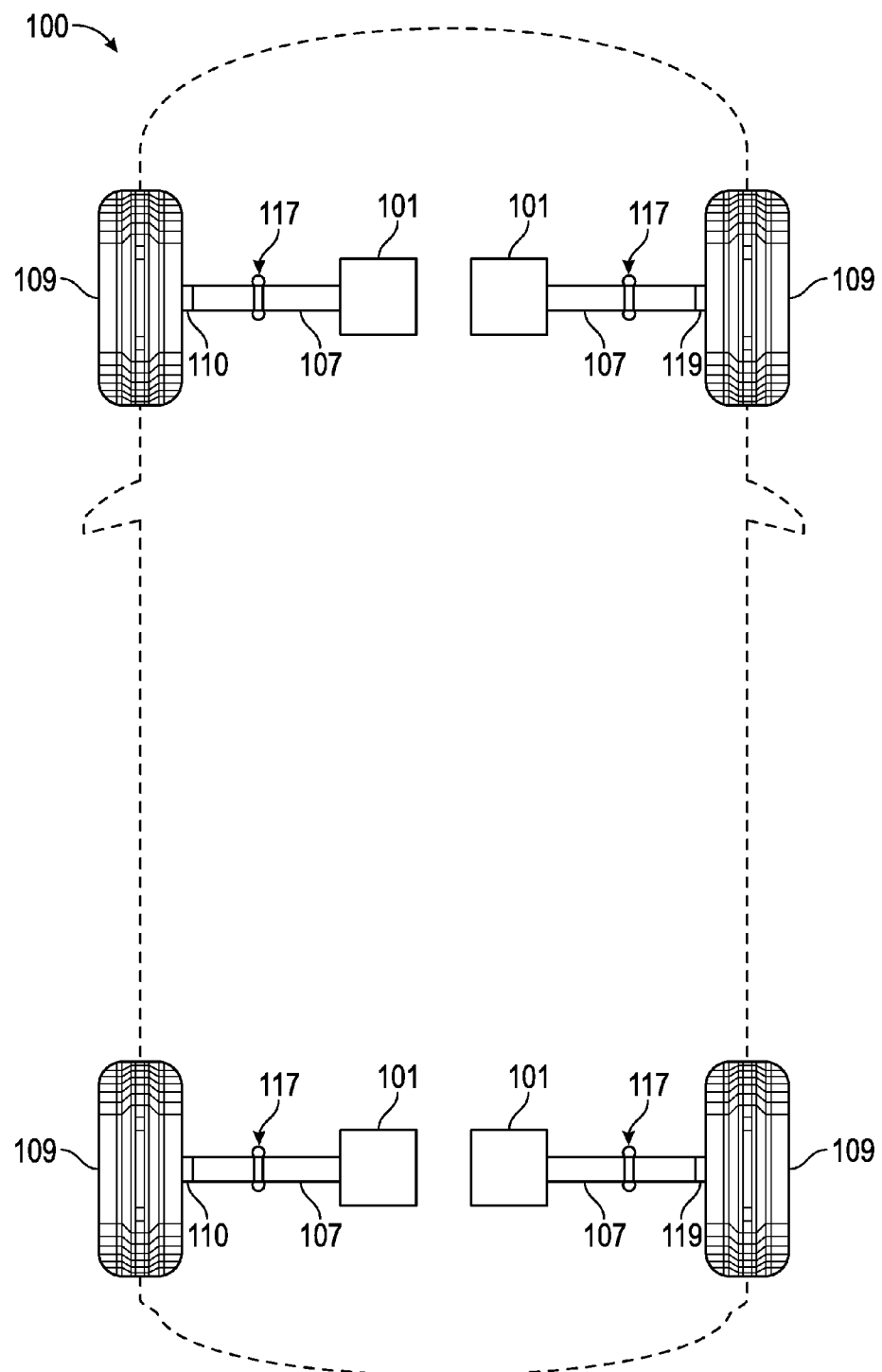
FIG. 1C is an illustration of a vehicle drivetrain having an all-wheel drive configuration and magnetic bearings according to one embodiment.

Referring now to FIG. 1C, vehicle drivetrain 100 is illustrated according to an embodiment in which each wheel 109 is driven by a separate motor 101. Motors 101 are high speed electric motors. For example, motors 101 may be electric motors capable of rotational speeds of 10,000 rotations per minute or higher. Motors 101 drive half shafts 107. Half shafts 107 may be hollow. In alternative embodiments half shafts 107 are solid. Motors 101 are located outside of wheels 109 in some embodiments.

In some embodiments, half shafts 107 are supported by bearings 117. Bearings 117 may be mechanical and/or magnetic bearings 300. In one embodiment, half shafts 107 are supported by a single bearing 117. In alternative embodiments, half shafts 107 are supported by two or more bearings 117. Half shafts 107 may drive wheel hub assemblies which may include bearings 119. Bearings 119 may be mechanical and/or magnetic bearings 300. As described in greater detail with reference to FIG. 2, each wheel 109 and motor 101 pair may include various additional components in various embodiments. Additional vehicle drivetrain 100 configurations other than those described herein are possible in various embodiments. Any combination of the features and/or components described herein and/or additional drivetrain components may be used in various embodiments of vehicle drivetrain 100.

Figure 2:
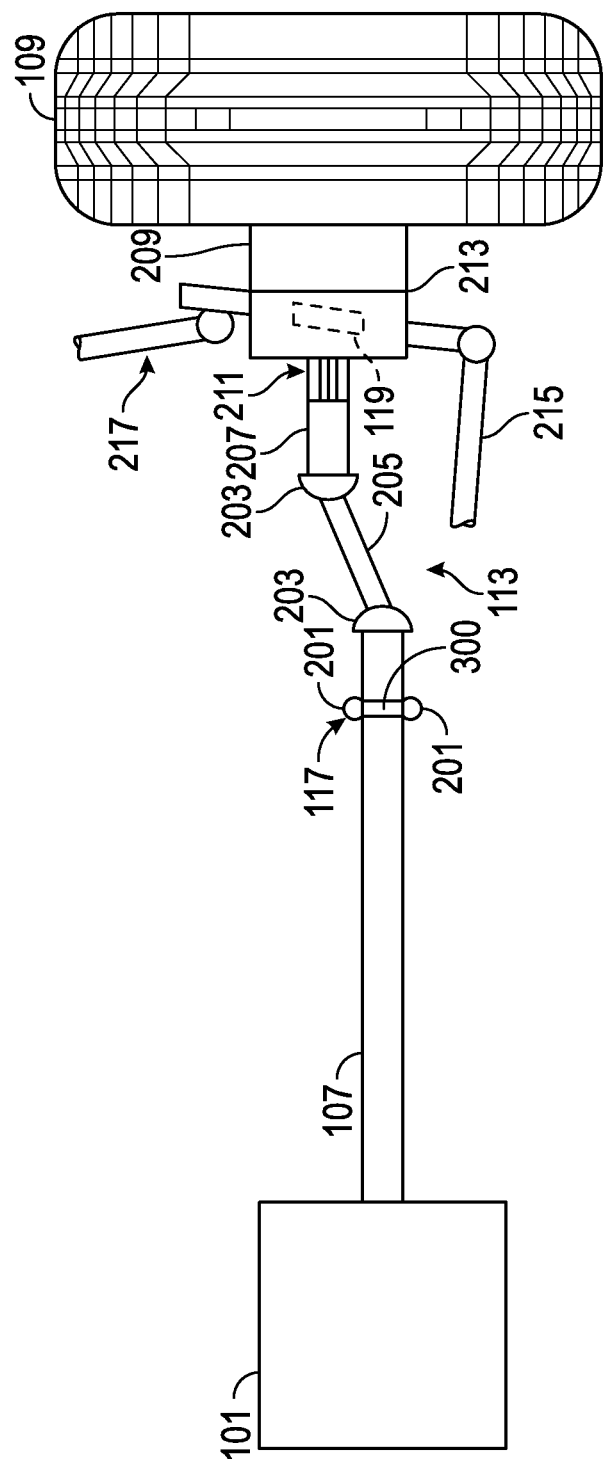
FIG. 2 is an illustration, in greater detail, of vehicle drivetrain components associated with a single wheel and including magnetic bearings according to one embodiment.

Referring now to FIG. 2, components of vehicle drivetrain 100 are illustrated in greater detail according to one embodiment. Motor 101 drives half shaft 107 and/or drive shaft 103. Half shaft 107 (e.g., a hollow shaft) may be an integral component of motor 101 (e.g., a high speed electric motor). Alternatively, half shaft 107 may be coupled to motor 101. Half shaft 107 is supported at least partially by bearing 117. Bearing 117 includes magnetic bearing 300. As explained in greater detail with reference to FIGS. 3A-3C, magnetic bearing 300 may be active (e.g., using electromagnets) or passive (e.g., using permanent magnets). In some embodiments, active magnetic bearings 300 include both electromagnets and permanent magnets. For example, permanent magnets may be used to support some of the load of the shaft with electromagnets producing a fraction of the force needed to support the shaft. In some embodiments, passive magnetic bearings 300 include both electromagnets and permanent magnets. For example, one or more electromagnets may be used to stabilize a shaft which is primarily supported by passive magnets. These and other configurations are discussed in more detail with reference to FIGS. 3A-3C. Bearing 117 further includes attachment points 201. Attachment points 201 may be a portion of the housing of magnetic bearing 300 and/or other portion of magnetic bearing 300 which allows for magnetic bearing 300 to be secured to the vehicle and/or another portion of vehicle drivetrain 100. For example, magnetic bearing 300 may be secured to a frame or chassis of the vehicle using attachment points 201. This allows magnetic bearing 300 to support half shaft 107. In further embodiments, a plurality of (e.g., 2 or more) bearings 117 are used to support half shaft 107. In alternative embodiments, bearing 117 is and/or includes mechanical bearings.

In some embodiments, half shaft 107, drive shaft 103, and/or other shafts of vehicle drivetrain 100 include bearings (e.g., bearings 117) which are internal to the shaft. In alternative embodiments, the bearings are external to the shaft.

Half shaft 107 includes one or more couplings 113 in some embodiments. Coupling(s) 113 allow for movement of half shaft 107 and/or wheel 109 relative to motor 101. For example, coupling(s) 113 allow for wheel 109 to move due to suspension travel while still being coupled to half shaft 107 and/or motor 101.

In one embodiment, coupling 113 includes one or more constant velocity joints 203. Constant velocity joint(s) 203 allow for flexure of half shaft 107. A first constant velocity joint 203 may be coupled to half shaft 107. The first constant velocity joint 203 may be coupled to intermediate portion 205 of half shaft 107. A second constant velocity joint 203 may be coupled to intermediate portion 205. The second constant velocity joint 203 may be further coupled to final portion 207 of half shaft 107. Coupling 113 (e.g., one, two, or more constant velocity joints 203) may allow vertical movement of wheel 109. In alternative embodiments, constant velocity joints 203 of coupling 113 are replaced with magnetic coupling 800 as explained in greater detail with reference to FIG. 8.

Half shaft 107 (e.g., final portion 207 of half shaft 107) may be coupled to wheel hub assembly 209. In some embodiments, final portion 207 of half shaft 107 includes splines 211. Wheel hub assembly 209 may be notched to accept splines 211. Splines 211 and/or notches included in wheel hub assembly 209 allow for half shaft 107 to move horizontally relative to wheel 109. This may allow for movement (e.g., due to suspension travel) of wheel 109 relative to motor 101 while wheel 109 continues to be driven by motor 101 and half shaft 107. In alternative embodiments, half shaft 107 and/or other shafts of vehicle drivetrain 100 are telescoping. Wheel hub assembly 209 may be rotatably coupled to knuckle 213 (e.g., a steering knuckle, hub carrier, and/or other component) using bearing 119. Bearing 119 is a mechanical bearing in one embodiment. In alternative embodiments, bearing 119 is a magnetic bearing 300.

Knuckle 213 may be coupled to one or more suspension components (e.g., a lower control arm, an upper control arm, shock absorber and/or spring, and/or other suspension components), steering components (e.g., a tie rod), and/or other vehicle drivetrain 100 components. In one embodiment, knuckle 213 is coupled to the vehicle by lower control arm 215. Knuckle 213 may further be coupled to the vehicle by upper control arm 217. Lower control arm 215 and/or upper control arm 217 may form part of the suspension of the vehicle. In alternative embodiments, knuckle 213 may be coupled to the vehicle using additional and/or alternative suspension components such as struts, dampers, shock absorbers, springs, and/or other components. Knuckle 213 substantially does not rotate and may be coupled to and/or otherwise include additional components of vehicle drivetrain 100 such as tie rods, brake calipers, anti-roll bars, and/or other components.

Figure 3A:
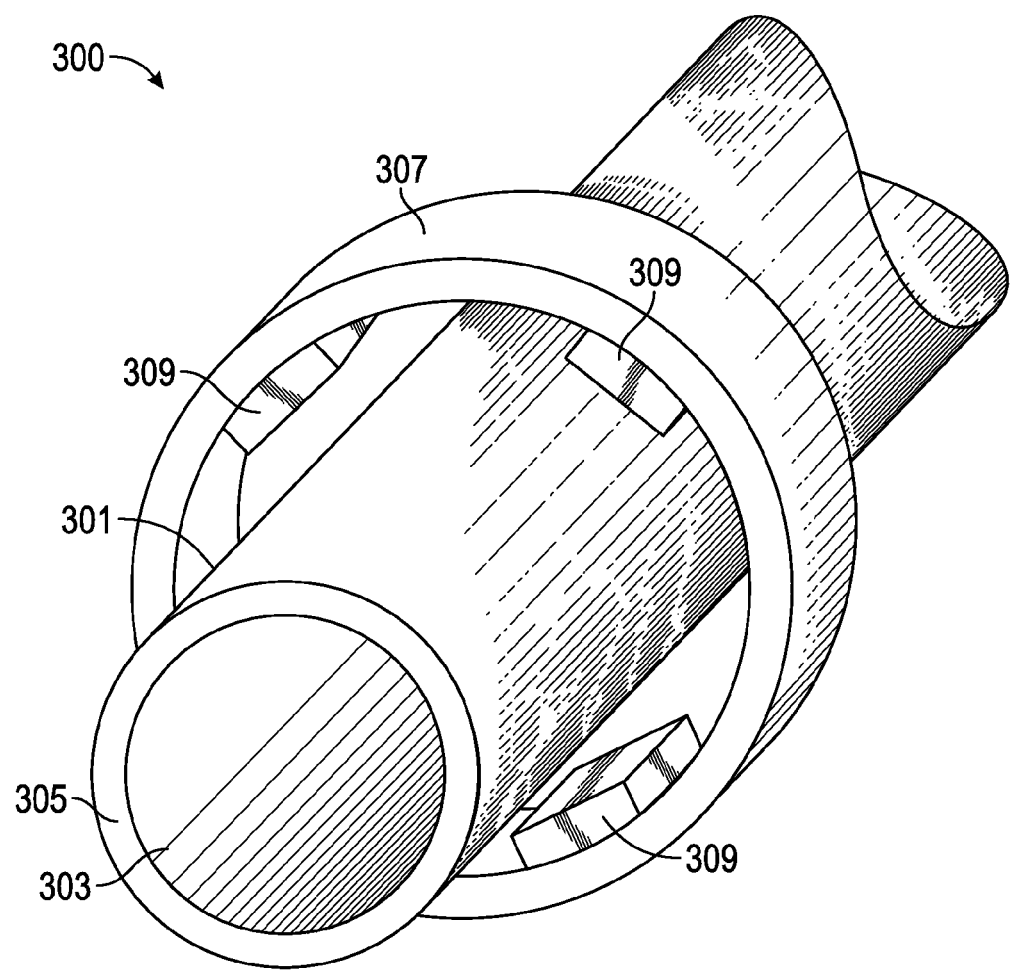
FIG. 3A is an illustration of an active magnetic bearing according to one embodiment.

Referring now to FIG. 3A, magnetic bearing 300 is illustrated according to one embodiment. Magnetic bearing 300 supports shaft 301 (e.g., drive shaft 103, half shaft 107, or another shaft of vehicle drivetrain 100). Shaft 301 is or includes a magnetic material in one embodiment. Magnetic bearing 300 produces magnetic fields which support shaft 301 within housing 307 of magnetic bearing 300. Magnetic bearing 300 may include a plurality of electromagnets 309 used to produce the magnetic fields which support shaft 301.

In one embodiment, shaft 301 is hollow and includes internal space 303. Shaft 301 has a tubular cross section 305. The thickness of shaft 301 varies in various embodiments. Shaft 301 may be substantially hollow, substantially solid, or have an intermediate thickness in various embodiments. Shaft 301 includes magnetic materials which interact with the magnetic fields produced by electromagnets 309. For example, shaft 301 may be made of, in whole or in part, a magnetic material (e.g., iron, iron alloy, nickel, etc.). In some embodiments, shaft 301 may include magnets which interact with electromagnets 309. In further embodiments, shaft 301 may include a coating, portion, or other section of a ferromagnetic material. For example, a non-magnetic material making up shaft 301 (e.g., aluminum) may be coated with a magnetic material (e.g., iron or an iron alloy).

Magnetic fields produced by electromagnets 309 may be controlled in order to support shaft 301 within housing 307. As explained in greater detail with reference to FIG. 3B, control circuitry may control the power to electromagnets 309 based on sensor data to position shaft 301 within housing 307. Housing 307 may be coupled to a frame or chassis of the vehicle such that shaft 301 is supported within housing 307 and in relation to the frame or chassis.

Figure 3B:
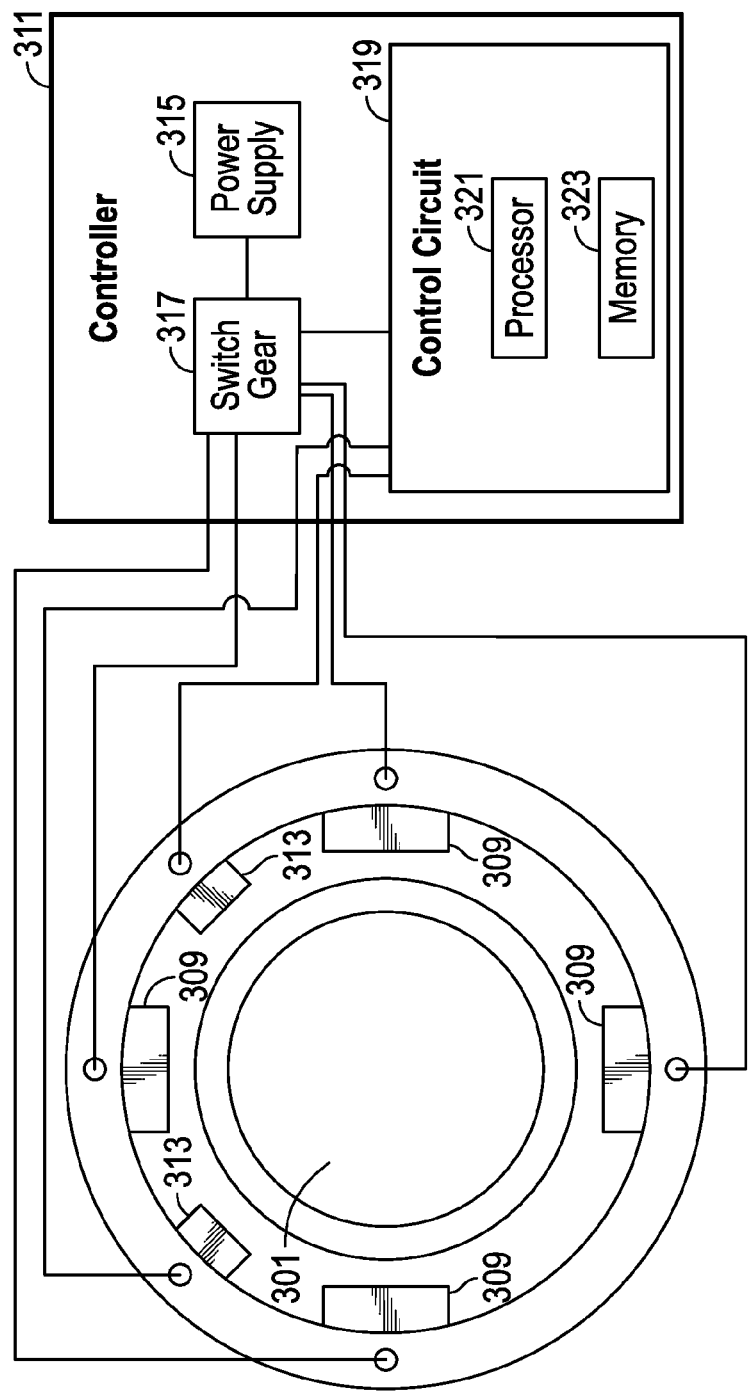
FIG. 3B is an illustration of an active magnetic bearing and controller according to one embodiment.

Referring now to FIG. 3B, magnetic bearing 300 and controller 311 are illustrated according to one embodiment. Controller 311 controls electromagnets 309 based on data from one or more position sensors 313. Controller 311 controls the magnetic field produced by electromagnets 309 in response to data from position sensor(s) 313 in order to support shaft 301 within housing 307. In some embodiments, controller 311 controls one or more of the strength of the magnetic field, duration of the magnetic field, turning on (e.g., activating) and off (e.g., deactivating) of electromagnets 309, the polarity of electromagnets 309, and/or other parameters of electromagnets 309 and/or the magnetic fields produced by electromagnets 309.

Controller 311 includes power supply/amplifier 315. Power supply 315 provides electrical power to electromagnets 309 and/or position sensors 313. Power supply 315 may provide power from a connection to one or more vehicle power sources. For example, power supply 315 may draw electrical power from one or more batteries included in the vehicle. In some embodiments, power supply 315 may draw power from other vehicle systems such as a vehicle power network, alternator, and/or other components. In alternative embodiments, power supply 315 includes a local power source such as a rechargeable battery. Power supply 315 may include components such as amplifiers, transformers, and/or other electrical components which modify electrical power from a power source prior to supplying the electrical power to other components of controller 311 and/or magnetic bearing 300. Power supply 315 may provide power to switch gear 317 and/or through switch gear 317 to other components of magnetic bearing 300 (e.g., electromagnets 309).

In some embodiments, controller 311 includes switch gear 317. Switch gear 317 controls the connections between one or more electromagnets 309 to power supply 315. Switch gear 317 allows for control of electromagnets 309. Electromagnets 309 may be turned on or off and/or the electrical power provided to electromagnets 309 may be controlled through the operation of switch gear 317 (e.g., as controlled by control circuit 319). Switch gear 317 may include electrical components such as transistors, mechanical relays, solid state relays, modulators, power regulation circuits, and/or other components which allow for the control of electrical power to electromagnets 309.

In some embodiments, switch gear 317 is controlled by control circuit 319. Control circuit 319 may control the modulation of power to electromagnets 309, turn off and on electromagnets 309, control the current provided to electromagnets 309, control the voltage provided to electromagnets 309, and/or otherwise control power delivery from power supply 315 to electromagnets 309. Control circuit 319 may control electromagnets 309 (e.g., through switch gear 317) based on data acquired by position sensor(s) 309 (e.g., inductive gap sensors, projected capacitance sensors, laser distance sensors, infrared sensors, and/or other touch less distance sensors or position sensors). For example, position sensor(s) 309 may provide acquired data regarding the position of shaft 301 in relation to housing 307 to control circuit 319. Control circuit 319 may determine the position of shaft 301 and control electromagnets 309 in order to substantially center shaft 301 within housing 307. For example, control circuit 319 may turn off a right hand electromagnet 309 and turn on a left hand electromagnet 309 in order to re-center shaft 301 which has drifted left of center. Through power regulation, modulation, and/or turning off and on of electromagnets 309, control circuit 319 may keep shaft 301 substantially centered or centered within housing 307.

Control circuit 319 may contain circuitry, hardware, and/or software for facilitating and/or performing the functions described herein. Control circuit 319 may handle inputs, process inputs, run programs, handle instructions, route information, control memory 323, control processor 321, process data, generate outputs, communicate with other devices or hardware, and/or otherwise perform general or specific computing tasks. In some embodiments, control circuit 319 includes processor 321. In some embodiments, control circuit 319 includes memory 323.

Processor 321 may be implemented as a general-purpose processor, an application specific integrated circuit (ASIC), one or more field programmable gate arrays (FPGAs), a digital-signal-processor (DSP), a group of processing components, or other suitable electronic processing components. Memory 323 is one or more devices (e.g. RAM, ROM, Flash Memory, hard disk storage, etc.) for storing data and/or computer code for facilitating the various processes described herein. Memory 323 may be or include non-transient volatile memory or non-volatile memory. Memory 323 may include database components, object code components, script components, or any other type of information structure for supporting various activities and information structures described herein. Memory 323 may be communicably connected to processor 321 and provide computer code or instructions to processor 321 for executing the processes described herein.

Memory 323 and/or control circuit 319 may facilitate the functions described herein using one or more programming techniques, data manipulation techniques, and/or processing techniques such as using algorithms, routines, lookup tables, arrays, searching, databases, comparisons, instructions, etc.

In some embodiments, control circuit 319 is included within controller 311. In alternative embodiments, control circuit 319 and/or other components of controller 311 are integrated with other components of vehicle drivetrain 100 or other vehicle systems. For example, control circuit 319 may be implemented as a general purpose computer or control circuitry which controls additional systems of the vehicle.

Figure 3C:
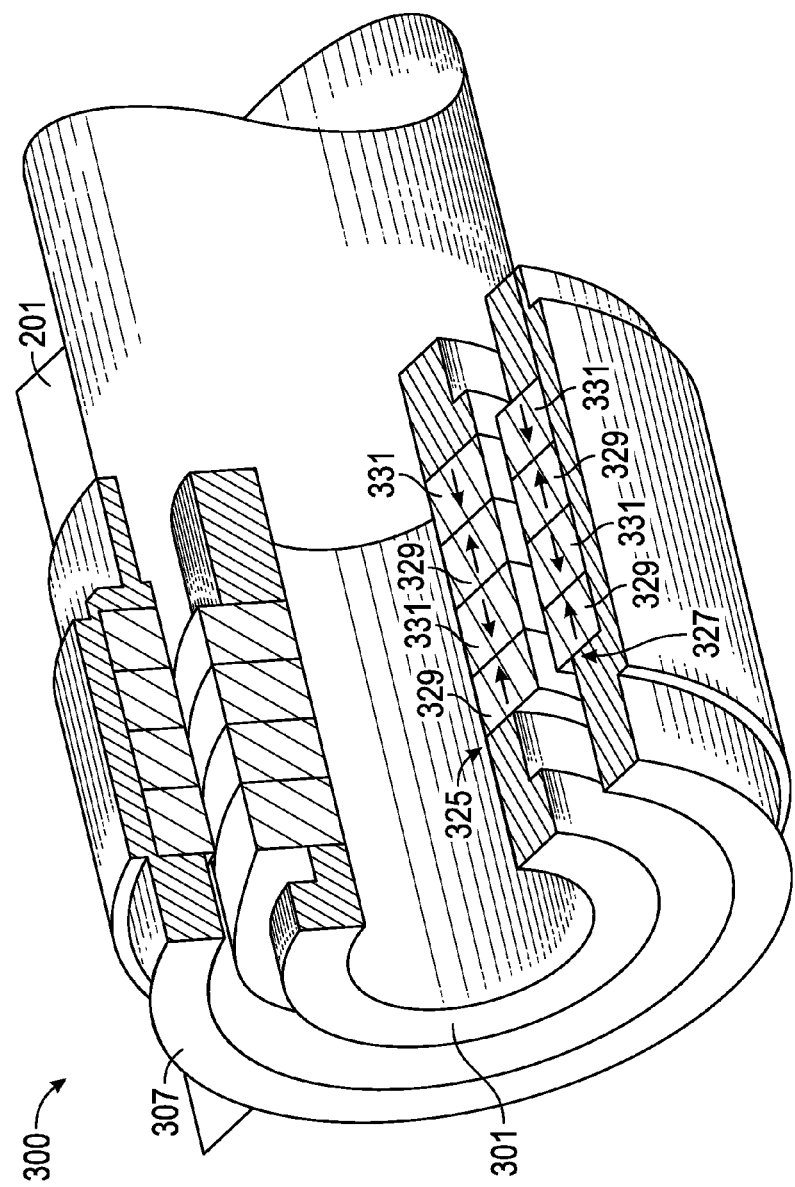
FIG. 3C is an illustration of a passive magnetic bearing according to one embodiment.

Referring now to FIG. 3C magnetic bearing 300 is illustrated according to an alternative embodiment. Magnetic bearing 300 may be passive rather than active as described with reference to FIG. 3B. Magnetic bearing 300 may include housing 307. Housing 307 is coupled to attachment point 201. Attachment point 201 allows for magnetic bearing 300 to be coupled to other vehicle components. Housing 307 includes one or more housing magnets 327. Housing magnets 327 are permanent magnets. Housing magnets 327 align with shaft magnets 325 included in shaft 301. Shaft magnets 325 are permanent magnets. Shaft magnets 325 include a series of magnets of opposite orientation. For example, shaft magnets 325 may include magnets arranged as first orientation magnet 329, second orientation magnet 331, first orientation magnet 329, and second orientation magnet 331. Housing magnets 327 include a series of magnets of opposite orientation in the same order such that magnetic poles of the same polarity are aligned between shaft 301 and housing 307. This causes shaft magnets 325 and housing magnets 327 to repulse each other. For example, magnets of first orientation 329 of shaft magnets 325 and housing magnets 327 are aligned and repulse each other. This causes shaft 301 to be centered within housing 307. In some embodiments, shaft magnets 325 and/or housing magnets 327 run the full circumference of shaft 301 and housing 307 respectively. In alternative embodiments, a plurality of magnets are used at discrete locations along the circumference of shaft 301 and/or housing 307.

Static passive magnetic bearings are unstable. Passive magnetic bearings with rotation, at least one constraint, or an actively-stabilized axis may be stable. Passive magnetic bearing 300 may become stable as shaft 301 rotates. Magnetic bearing 300 may include touchdown bearings or other features which provide a constraint to the movement of shaft 301 within magnetic bearing 300. In some embodiments, shaft 301 may be stabilized using one or more controlled electromagnets which produce a magnetic field exerting a stabilizing force on shaft 301.

Referring now to FIGS. 3A-3C, in some embodiments, active magnetic bearings 300 include both electromagnets 309 and permanent magnets (e.g., shaft magnets 325 and/or housing magnets 327). An active magnetic bearing 300 may employ a combination a permanent magnets and stabilizing electromagnets 309. For example, permanent magnets may be used to support some of the load of shaft 301 with electromagnets 309 producing a fraction of the force needed to support shaft 301. The permanent magnets may provide a force which alone is insufficient to center shaft 301 within magnetic bearing 300. Electromagnets 309 may provide a force which causes shaft 301 to be centered within magnetic bearing 300. Advantageously, this may reduce the amount of force generated by electromagnets 309 as the permanent magnets provide the majority of the force needed to support shaft 301. This in turn may reduce the amount of power consumed by electromagnets 309 reducing the amount of electrical power needed by vehicle drivetrain 100. Advantageously, this may extend the range of an electric vehicle having vehicle drivetrain 100.

In some embodiments, passive magnetic bearings 300 include both electromagnets 309 and permanent magnets. For example, one or more electromagnets 309 may be used to stabilize shaft 301 which is primarily supported by passive magnets. Electromagnets 309 may add to the stability of shaft 301. Advantageously, this may reduce wear on touchdown bearings and/or other components which assist in stabilizing and/or supporting shaft 301.

Various embodiments of magnetic bearing 300 include various components described herein with respect to passive magnetic bearings 300 and/or active magnetic bearings 300. Magnetic bearing 300 may be a hybrid bearing. Magnetic bearing 300 may include permanent magnets, electromagnets 300, and/or mechanical bearings. Permanent magnets may be used to provide supporting force to shaft 301 and/or facilitate stabilization of shaft 301. Electromagnets 309 may provide a stabilizing force to center shaft 301 within magnetic bearing 300. Electromagnets 309 may further provide force to support shaft 301. Magnetic bearing 300 may be a passive magnetic bearing with electromagnets having a fixed field when in operation. The electromagnets may support shaft 301 with fixed fields which do not vary. Magnetic bearing 300 may not include position sensor(s) 309 in such an embodiment. Magnetic bearing 300 may be a passive magnetic bearing including electromagnets having a variable field not actively controlled. For example, the field may vary based on load in the vehicle, vary based on the position of the electromagnet (e.g., underneath shaft 301 vs. above shaft 301), or otherwise vary but not be actively controlled. Magnetic bearing 300 may be passive at least partly an active magnetic bearing. For example, magnetic bearing 300 may include electromagnets actively controlled in addition to electromagnets which are not actively controlled. The actively controlled electromagnets may provide a centering force on shaft 301. Magnetic bearing 300 may be a passive magnetic bearing which includes actively-controlled electromagnets. Magnetic bearing 300 may be a passive magnetic bearing which is a hybrid bearing including both passive and active bearing elements.

Magnetic bearing 300 may include permanent magnets and employ dynamic mirroring to support shaft 301. Poles of the permanent magnets may be located near a conductor included in or on shaft 301. For example, the magnetic field produced by the permanent magnets may extend outward and envelop shaft 301. Shaft 301 may be made of or include a conductor such as aluminum. When shaft 301 rotates, the conductor moves. The moving conductor may create repulsion forces in conjunction with the permanent magnets to create a stable system. The moving conductor may expel the field lines of the magnetic fields produced by the permanent magnets resulting in forces which stabilize shaft 301. Dynamic mirroring may be used in a passive magnetic bearing 300 including only permanent magnets. Dynamic mirroring may be used in a passive magnetic bearing 300 in conjunction with electromagnets 309. Dynamic mirroring may be used in active magnetic bearings 300 which include only electromagnets 309 or a combination of electromagnets 309 and permanent magnets.

Still referring to FIGS. 3A-3C, in some embodiments, shaft 301 includes magnets which interact with magnetic bearing 300. Magnets included in or on shaft 301 may be permanent magnets and/or electromagnets 309. Electromagnets 309 included in or on shaft 309 may be controlled by control circuit 319 or another control circuit included in a vehicle having vehicle drivetrain 100. In further embodiments, shaft 301 may be made of or include a section of ferromagnetic material. The ferromagnetic material may be used to interact with magnetic bearing 300. In still further embodiments, shaft 301 may be or include a section of a conductor which interacts with magnetic fields produced by magnetic bearing 300.

In some embodiments, shaft 301 is supported by a plurality of magnetic bearings 300. Shaft 301 may be supported by two or more magnetic bearings 300 of the same type. Shaft 301 may be supported by two or more magnetic bearings 300 of different types. For example, shaft 301 may be supported by a passive magnetic bearing 300 at one end and an active magnetic bearing 300 at the other end. In some embodiments, shaft 301 may be supported by passive magnetic bearings 300 at each end and an active magnetic bearing 300 in between which constrains bending of shaft 301. Alternative embodiments include alternative configurations of magnetic bearings 300 having different configurations.

Figure 4:
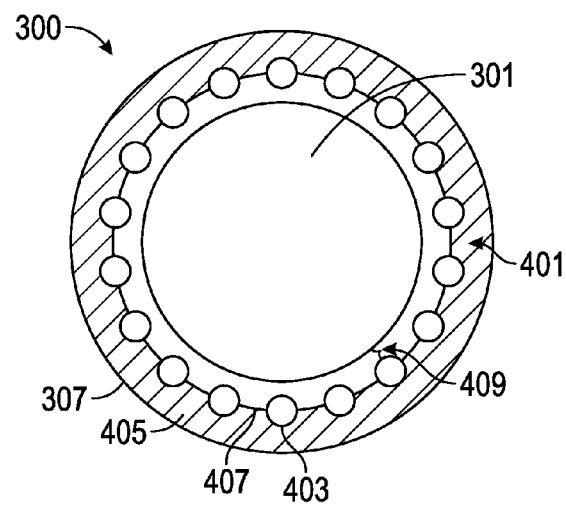
FIG. 4 is a cross section illustration of a mechanical touchdown bearing in relationship to a shaft according to one embodiment.

Referring now to FIG. 4, a cross section of magnetic bearing 300 including one or more touchdown bearings 401 is illustrated according to one embodiment. Touchdown bearings 401 prevent damage to shaft 301, magnetic bearing 300, and/or other components of vehicle drive train 100 in the event of failure of magnetic bearing 300. Failure of magnetic bearing 300 may include a loss of power to magnetic bearing 300, excessive force placed on shaft 301, and/or other conditions in which magnetic bearing 300 is unable to prevent shaft 301 from contacting housing 307.

In further embodiments, vehicle drivetrain 100 uses a combination of magnetic bearing 300 and mechanical bearings such as touchdown bearings 401. Vehicle drivetrain 100 may transition from the use of mechanical bearings 401 to magnetic bearings 300 and from the use of magnetic bearings 300 to touchdown bearings 401. In one embodiment, vehicle drivetrain 100 transitions from the use of mechanical bearings such as touchdown bearings 401 to magnetic bearing 300 once the vehicle has reached a predetermined speed (e.g., 55 miles per hour approximately 88 kilometers per hour). The shift or transition from mechanical bearings to magnetic bearings 300 may prevent or reduce friction losses caused by friction between the mechanical bearing and shaft 301 and/or reduce or prevent wear on shaft 301 and/or the mechanical bearings, as shaft 301 is no longer in contact with the mechanical bearings.

In some embodiments, touchdown bearings 401 provide protection and/or facilitate the transition from mechanical bearings (e.g., touchdown bearings 401) to magnetic bearings 300 and/or from magnetic bearings 300 to mechanical bearings (e.g., touchdown bearings 401). Touchdown bearings 401 include a plurality of bearing elements 403. Bearing elements 403 may be ball bearings, roller bearings, thrust bearings, tapered bearings, and/or other types of bearings. Touchdown bearings 401 may have no moving parts. In embodiments of touchdown bearings 401 having moving parts, bearing elements 403 may be located partially within race 405. Race 405 may secure bearing elements 403 and/or allow bearing elements 403 to move relative to race 405. In some embodiments, bearing elements 403 may be secured, in whole or in part, by cage 407.

Bearing elements 403 and touchdown bearings 401 are configured (e.g., placed and sized) such that gap 409 separates shaft 301 from bearing elements 403 when shaft 301 is substantially centered within housing 307. When shaft 301 is supported by magnetic bearings 300, shaft 301 is substantially centered within housing 307 and gap 409 prevents shaft 301 from contacting bearing elements 403. This prevents wear on bearing elements 403 and/or shaft 301 while reducing or eliminating friction losses caused by friction between bearing elements 403 and shaft 301. In some embodiments, bearing pads (e.g., Teflon pads) or other limited-life bearing mechanisms may be used as touchdown bearings 401, since the touchdown bearings 401 experience limited use as shaft 301 is typically supported by magnetic bearing 301 while shaft 301 is rotating. When magnetic bearings 300 fail or a transition from magnetic bearings 300 to mechanical bearings (e.g., touchdown bearings 401) takes place, shaft 301 comes into contact with bearing elements 403 in at least one location. Gap 409 is eliminated in at least those locations. The transition from supporting shaft 301 with magnetic bearing 300 to supporting shaft 301 with touchdown bearing 401 may include turning off magnetic bearing 300. This causes shaft 301 to no longer be centered within magnetic bearing 300 (e.g., not in contact with touchdown bearing 401). Gravity causes shaft 301 to settle into contact with touchdown bearing 401 and touchdown bearing 401 supports shaft 301. Shaft 301 may not be centered within magnetic bearing 300 and/or touchdown bearing 401.

Gap 409 may be various sizes in various embodiments. Gap 409 may be increased in order to increase the tolerance of misalignment of shaft 301 while supported by magnetic bearings 300. This may reduce the likelihood that shaft 301 comes into contact with bearing elements 403 while supported by magnetic bearings 300. Gap 409 may be reduced in order to decrease the wear caused by motion of shaft 301 relative to bearing elements 403 when shaft 301 is supported by touchdown bearings 401. These and/or other design considerations may be taken into account when sizing gap 409 in various embodiments.

Figure 5A:
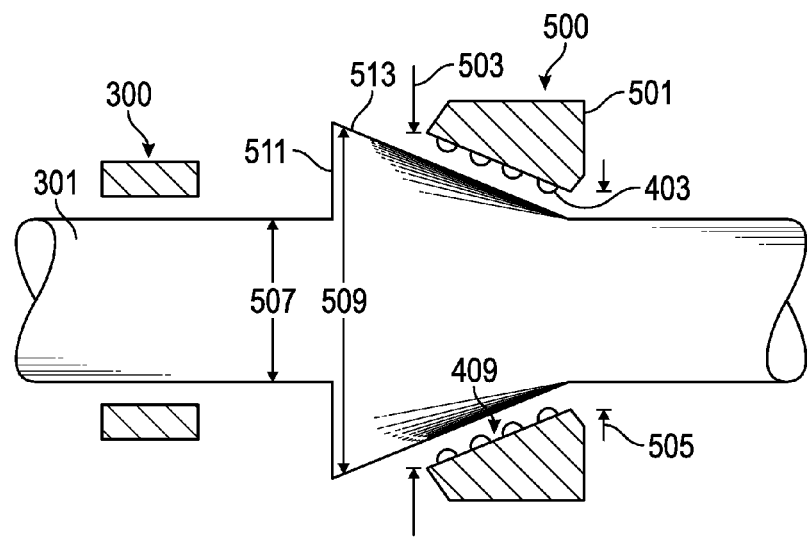
FIG. 5A is an illustration of a mechanical bearing and shaft configured to transition between being supported by the mechanical bearing and by a magnetic bearing according to one embodiment.

Referring now to FIG. 5A, a portion of vehicle drivetrain 100 including mechanical bearing 500 is illustrated according to one embodiment. Mechanical bearing 500 and/or shaft 301 may be configured (e.g., with an orientation, geometry, size, etc.) to allow for transition between the use of mechanical bearing 500 and magnetic bearing 300 to support shaft 301. Mechanical bearing 500 includes bearing elements 403. Bearing elements 403 are secured within body 501 of mechanical bearing 500. Body 501 may be secured to a portion of the vehicle such that mechanical bearing 500 is stationary relative to shaft 301. Mechanical bearing 500 may support shaft 301 as mechanical bearing 500 is secured to the vehicle (e.g., a frame of the vehicle). Mechanical bearing 500 is configured to receive shaft 301 and engage shaft 301 at bearing elements 403 as shaft 301 is inserted into mechanical bearing 500. Shaft 301 disengages from bearing elements 403 when shaft 301 is withdrawn from mechanical bearing 500. In some embodiments, mechanical bearing 500 reduces from first diameter 503 to second diameter 505.

Shaft 301 moves relative to mechanical bearing 500 such that shaft 301 engages and disengages bearing elements 403 based on the position of shaft 301 relative to mechanical bearing 500. In some embodiments, shaft 301 includes first diameter 507 and second diameter 509. Second diameter 509 is larger than first diameter 507 and is formed by flange 511 of shaft 301. Flange 511 defines taper 513 which reduces flange 511 to first diameter 507 from second diameter 509. Taper 513 forms a surface parallel to the plane of bearing elements 403 of mechanical bearing 500.

In some embodiments, shaft 301 is inserted into mechanical bearing 500 to engage with bearing elements 403. Gap 409 is reduced or eliminated and taper 513 of flange 511 contacts bearing elements 403. Bearing elements 403 and mechanical bearing 500 support shaft 301. Shaft 301 may be withdrawn from mechanical bearing 500 and supported by magnetic bearing 300. As flange 511 and taper 513 of shaft 301 are withdrawn from mechanical bearing 500, gap 409 (between shaft 301 and mechanical bearing 500) is increased and shaft 301 is no longer in contact with bearing elements 403. Gap 409 increases due to the geometry of taper 513 and first diameter 507 of shaft 301. First diameter 507 of shaft 301 is less than second diameter 505 of mechanical bearing 500. This allows shaft 301 to rotate without contacting mechanical bearing 500 when shaft 301 is supported by magnetic bearing 300.

In various alternative embodiments, mechanical bearing 500 has various alternative geometries and/or configurations. Shaft 301 may also have various configurations and/or geometries. Shaft 301 and mechanical bearing 500 may be configured to allow for the transition between the use of mechanical bearing 500 and magnetic bearing 300. In some embodiments, vehicle drivetrain 100 further includes touchdown bearing(s) 401 used in conjunction with mechanical bearing 500. In alternative embodiments, vehicle drivetrain 100 or a portion thereof includes either touchdown bearing(s) 401 or mechanical bearing(s) 500.

Figure 5B:
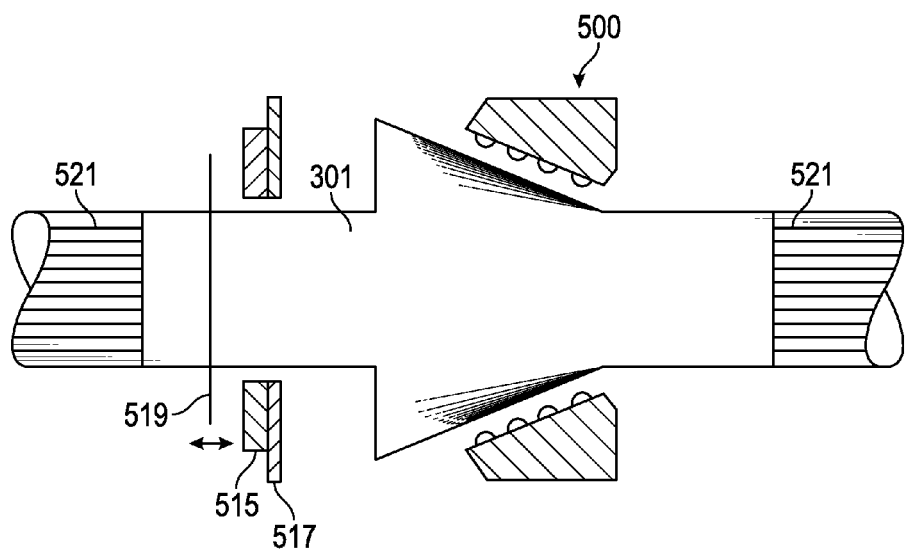
FIG. 5B is an illustration of a magnetic system for transitioning support of a shaft between a mechanical bearing and a magnetic bearing according to one embodiment.

Referring now to FIG. 5B, in some embodiments shaft 301 is inserted and/or withdrawn from mechanical bearing 500 using electromagnets 515. Electromagnets 515 are secured to or included in housing 517. Housing 517 is attached to the vehicle. Housing 517 and electromagnets 515 partially or completely encircle shaft 301. Housing 517 and electromagnets 515 are spaced apart from shaft 301. For example, electromagnets 515 and housing 517 may encircle shaft 301 with a gap allowing shaft 301 to rotate freely within electromagnets 515 and housing 517 (e.g., shaft 301 does not contact electromagnets 515 or housing 517). Electromagnets 515 are controlled (e.g., turned on and off) by a control circuit. In some embodiments, controller 311 controls electromagnets 515 (e.g., using control circuit 319). Controller 311 may control the position of shaft 301. This allows controller 311 to position shaft 301 such that shaft 301 is supported by mechanical bearing 500 prior to turning off magnetic bearing 300. Controller 311 may further withdraw shaft 301 from mechanical bearing 500 when shaft 301 is supported by magnetic bearing 300.

In some embodiments, electromagnets 515 produce a magnetic field which repulses plate 519 when turned on (e.g., provided power). Plate 519 is attached to shaft 301 and rotates with shaft 301. Plate 519 may be or include any magnetic material. Repulsing plate 519 with electromagnets 515 causes shaft 301 to disengage from (e.g., withdraw from) mechanical bearing 500. In alternative embodiments, electromagnets 515 attract plate 519 when turned on. This causes shaft 301 to engage mechanical bearing 500. In further embodiments, the polarity of plate 519 is fixed and the polarity of the magnetic field produced by electromagnets 515 is variable. The polarity of electromagnets 515 may be controlled by control circuit 319 or another control circuit. Electromagnets 515 may produce a first magnetic field with a first polarity to attract plate 519 and insert shaft 301 into mechanical bearing 500. Electromagnets 515 may produce a second magnetic field with a second polarity to repulse plate 519 and withdraw shaft 301 from mechanical bearing 500. In further alternative embodiments, plate 519 is actuated by a spring, biasing element, actuator, and/or other mechanical or electromechanical system to place shaft 301 in a normal position (e.g., normally inserted into mechanical bearing 500 or normally withdrawn from mechanical bearing 500). This system may be in contact with plate 519 and/or shaft 301 using bearings or other elements which allow shaft 301 to rotate relative to the system. Electromagnets 515 may actuate plate 519 and shaft 301 in the direction opposing the spring or other element.

Still referring to FIG. 5B, shaft 301 includes one or more spline sections 521 in some embodiments. Spline sections 521 allow shaft 301 to move relative to mechanical bearing 500, motor 101, and/or other components of vehicle drivetrain 100 while remaining in mechanical connection with driven and/or driving components (e.g., motor 101, wheel 109, coupling 113, and/or other components). Spline sections 521 may be inserted into corresponding notches in components which drive shaft 301 and/or components which are driven by shaft 301. Shaft 301 moves relative to these components with spline sections 521 sliding relative to the notches and remaining in mechanical connection with the notches.

Figure 5C:
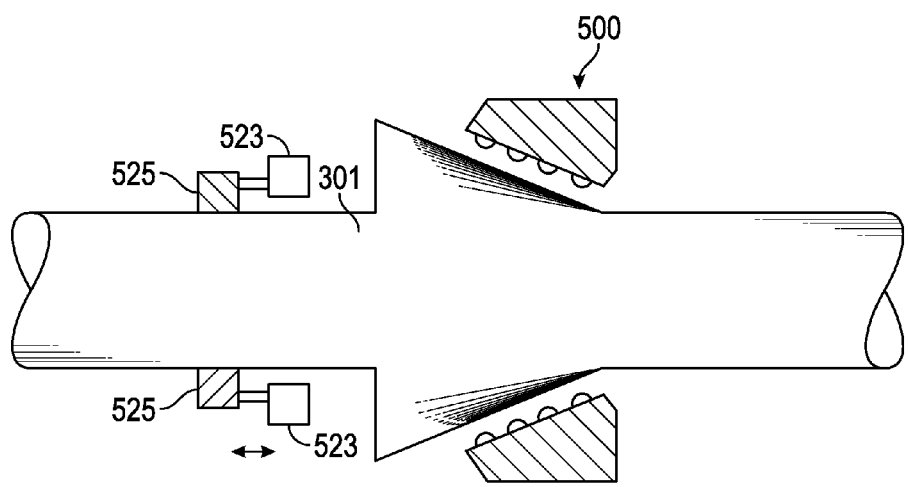
FIG. 5C is an illustration of an actuator system for transitioning support of a shaft between a mechanical bearing and a magnetic bearing according to one embodiment.

Referring now to FIG. 5C, in some embodiments shaft 301 is inserted into and/or withdrawn from mechanical bearing 500 using actuators 523. Actuators 523 may be any mechanical or electromechanical actuator. For example, actuators 523 may be a solenoid, hydraulic piston, or other device. Actuators 523 are coupled to flange 525 of shaft 301. Actuators 523 apply force to move flange 525 and shaft 301 into contact with and out of contact with mechanical bearing 500. In one embodiment, flange 525 is fixed to shaft 301 and rotates with shaft 301. Actuators 523 may be coupled to flange 525 with bearings which allow shaft 301 and flange 525 to rotate. In alternative embodiments, flange 525 is stationary and a portion of shaft 301 rotates within flange 525. Flange 525 may include one or more mechanical bearings or magnetic bearings which allow the portion of shaft 301 to rotate within flange 525 and for flange 525 to exert translational force on shaft 301.

In some embodiments, flange 525 is actuated by a spring, biasing element, actuator, and/or other mechanical or electromechanical system to place shaft 301 in a normal position (e.g., normally inserted into mechanical bearing 500 or normally withdrawn from mechanical bearing 500). This actuation system may be in contact with flange 525 and/or shaft 301 using bearings or other elements which allow shaft 301 to rotate relative to the system. Actuators 523 may actuate flange 525 and shaft 301 in the direction opposing the spring or other element.

In one embodiment, a centrifugal mechanism controls contact between shaft 301 and mechanical bearing 500. The centrifugal mechanism is configured to engage and disengage shaft 301 from mechanical bearing 500 by moving shaft 301, or a portion thereof, and/or mechanical bearing 500, or a portion thereof, based on the rotational speed of shaft 301. For example, the centrifugal mechanism may be a centrifugal clutch which causes a portion of shaft 301 to disengage with mechanical bearing 500 when shaft 301 is rotating above a threshold speed. Below the threshold speed the centrifugal clutch may cause the portion of shaft 301 to engage with mechanical bearing 500. Alternatively, the centrifugal clutch may cause a portion of mechanical bearing 500 to engage or disengage with shaft 301 based on the rotational speed of shaft 301.

Referring again to FIG. 5A, in some embodiments, shaft 301 is inserted and/or withdrawn from mechanical bearing 500 using forces generated by magnetic bearing 300, mechanical bearing 500, and/or motor 101. Once shaft 301 reaches a predetermined rotational speed, reaction forces from one or more of magnetic bearing 300, mechanical bearing 500, and/or motor 101 may cause shaft 301 to withdraw from mechanical bearing 500. For example, a reaction force caused by the magnetic field produced by magnetic bearing 300 may cause shaft 301 to withdraw from mechanical bearing 500. In some embodiments, the reduction in rotation speed of shaft 301 causes shaft 301 to be inserted into mechanical bearing 500 as reaction forces from one or more of magnetic bearing 300, mechanical bearing 500, and/or motor 101 are reduced. In alternative embodiments, shaft 301 is inserted into mechanical bearing 500 using a spring, biasing element, actuator, and/or other mechanical or electromechanical system.

Figure 6:
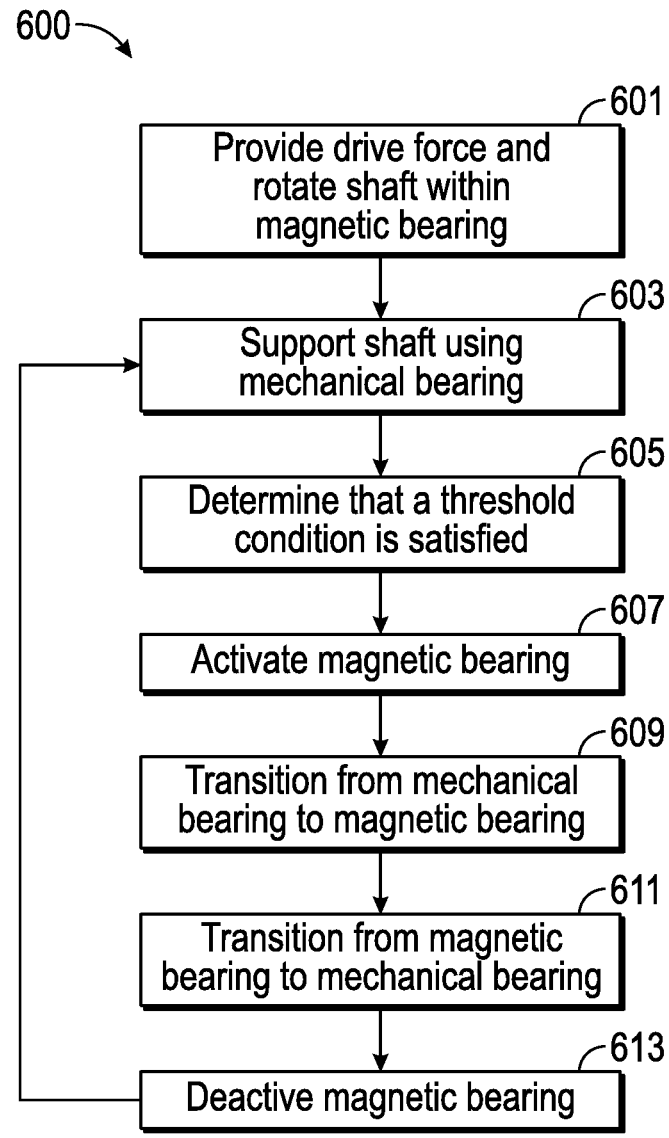
FIG. 6 is an illustration of a flow chart showing a method of operating a vehicle drivetrain including magnetic bearings according to one embodiment.

Referring now to FIG. 6, method 600 for controlling vehicle drivetrain 100 having mechanical bearing 500 and magnetic bearing 300 is illustrated according to one embodiment. A drive force which rotates shaft 301 is provided (601). For example, the drive force may be provided by motor 101 such as an electric motor, high-speed electric motor, and/or other motor or engine. In some embodiment, motor 101 is a high-speed electric motor and shaft 301 is hollow. Shaft 301 may be supported by one or more mechanical bearings (603). For example, shaft 301 may be supported by one or more of touchdown bearing 401 and/or mechanical bearing 500. It may be determined that a threshold condition is satisfied for transferring support of shaft 301 from one more mechanical bearings to one or more magnetic bearing 300 (605). For example, a control circuit (e.g., control circuit 319 of controller 311) may determine from one or more sensors or data inputs that the vehicle speed is greater than a threshold value (e.g., 55 miles per hour). One or more magnetic bearing 300 is activated (607). For example, controller 311 may begin providing electrical power to one or more electromagnets 309 of magnetic bearing 300 in response to determining that the threshold condition is satisfied.

Support of shaft 301 is transitioned from one or more mechanical bearings to one or more magnetic bearings 300 (609). For example, magnetic bearing 300 may center shaft 301 within touchdown bearing 401 such that shaft 301 does not contact bearing elements 403. In some embodiments, a control circuit (e.g., control circuit 319 of controller 311) withdraws shaft 301 from contact with mechanical bearing 500. For example, electromagnets 515 may be used to withdraw shaft 301 from contact with bearing elements 403 of mechanical bearing 500.

In some embodiments, support of shaft 301 is transitioned from one or more magnetic bearing 300 to one or more mechanical bearings (611). For example, when the threshold is no longer met (e.g., vehicle speed drops below 55 miles per hour), shaft 301 may be supported by one or more mechanical bearings. In some embodiments, magnetic bearings 300 are turned off or disengaged (e.g., by controller 311) in response to the threshold condition no longer being met. Touchdown bearings 401 may then support shaft 301. Alternatively or additionally, shaft 301 may be inserted into mechanical bearing 500 such that shaft 301 is in contact with and supported by bearing elements 403 of mechanical bearing 500. Magnetic bearings 300 may be deactivated, turned off, or otherwise cease to support shaft 301 (613). Shaft 301 is then supported by one or more mechanical bearings. Support of shaft 301 may transition between one or more mechanical bearings and one or more magnetic bearing 300 iteratively (e.g., depending on whether or not a threshold condition is satisfied or not).

In alternative embodiments, other threshold conditions may be used in place of or in combination with vehicle speed and/or one another. Other threshold conditions may include a shaft rotation rate, a power availability, and/or a vibration level. One or more of these and/or other threshold conditions, alone or combination, may be used as the basis for transitioning support of shaft 301 between (A) one or more magnetic bearings 300 and (B) one or more mechanical bearings 500. These and/or other threshold conditions, alone or in combination, may further be used for transitioning support of shaft 301 from between magnetic bearings 300 of different configurations, locations, and/or otherwise having different characteristics. Shaft rotation rate may be measured by one or more sensors (e.g., a hall effect sensor) and/or determined by a control circuit (e.g., control circuit 319). Power availability may be determined by a control circuit (e.g., control circuit 319). Power availability may be the amount of electrical power stored in one or more batteries of an electric vehicle having vehicle drivetrain 100. Control circuit 319 may, for example, transition support of shaft 301 from active magnetic bearings 300 to passive magnetic bearings 300 and/or mechanical bearings 500 when stored battery power, estimated remaining driving range, and/or other measures related to available power are reduced below a threshold value. Advantageously, in an electric vehicle this may increase or preserve the amount of power available for driving an electric motor 101 as electrical power used for supporting shaft 301 is reduced or eliminated. This may extend the remaining range of the vehicle. Vibration level may relate to the roughness of a road surface. Magnetic bearing(s) 300 may be unable to support shaft 301 without the use of mechanical bearing(s) 500 in certain driving conditions such as off road driving or driving on rough road surfaces. In such cases, a control circuit (e.g., control circuit 319) may transition support of shaft 301 to one or more mechanical bearings 500 while the vehicle travels over rough surfaces (e.g., a measured vibration amount exceeds a threshold value). Vibration may be measured by one or more sensors (e.g., accelerometers, piezoelectric vibration sensors, piezoelectric pressure transducers, and/or other vibration sensors).

Figure 7A:
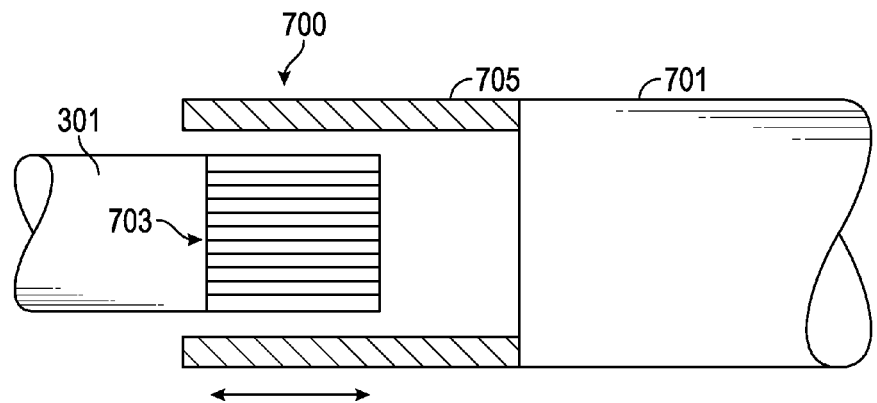
FIG. 7A is an illustration of a magnetic coupling allowing for translation between components according to one embodiment.

Referring now to FIG. 7A, in some embodiments, vehicle drivetrain 100 includes magnetic coupling 700. Magnetic coupling 700 allows for translation between shaft 301 and receiver 701. Shaft 301 may be any shaft of vehicle drivetrain 100. For example, shaft 301 may be drive shaft 103, half shaft 107, and/or another shaft. Receiver 701 may be a second portion of shaft 301 (e.g., final portion 207), wheel hub assembly 209, and/or another component of vehicle drivetrain 100. Magnetic coupling 700 may perform the functions described herein with reference to spline sections 521. Advantageously, magnetic coupling 700 allows for translation between shaft 301 and receiver 701 and the continuous application of rotational drive to receiver 701 without physical contact. Magnetic coupling 700 includes a plurality of shaft magnets 703. Shaft magnets 703 may be permanent magnets and/or electromagnets. Magnetic coupling 700 further includes a plurality of receiver magnets 705. Receiver magnets 705 may be permanent magnets and/or electromagnets. Shaft magnets 703 and receiver magnets 705 interact in order to impart rotation from shaft 301 to receiver 701 (e.g., due to the interaction of magnetic fields).

Figure 7B:
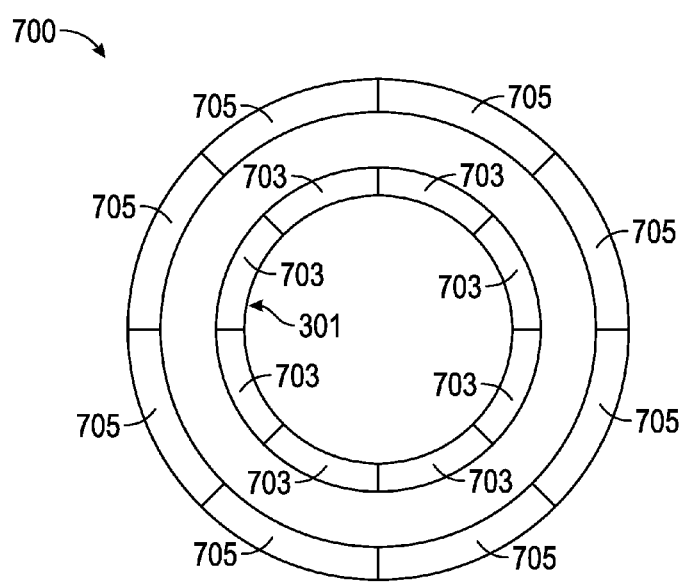
FIG. 7B is a profile illustration of a magnetic coupling allowing for translation between components according to one embodiment.

Referring now to FIG. 7B, a profile view of magnetic coupling 700 is illustrated according to one embodiment. Shaft magnets 703 may be located continuously along the circumference of shaft 301. In alternative embodiments, shaft magnets 703 do not run continuously along the entire circumference of shaft 301. Shaft magnets 703 may have alternating polarities such that adjacent shaft magnets 703 do not have the same polarity. Receiver magnets 705 may be located continuously along the circumference of receiver 701. In alternative embodiments, receiver magnets 705 do not run continuously along the entire circumference of receiver 701. Receiver magnets 705 may have alternating polarities such that adjacent receiver magnets 705 do not have the same polarity. The interaction of magnetic fields from shaft magnets 703 and receiver magnets 705 imparts rotation from shaft 301 onto receiver 701, causing receiver 701 to rotate. In some further embodiments, magnetic coupling 700 further includes additional components. For example, magnetic coupling 700 may include pole pieces or other components which enhance, direct, or otherwise modify the magnetic field produced by shaft magnets 703 and/or receiver magnets 705.

Figure 8:
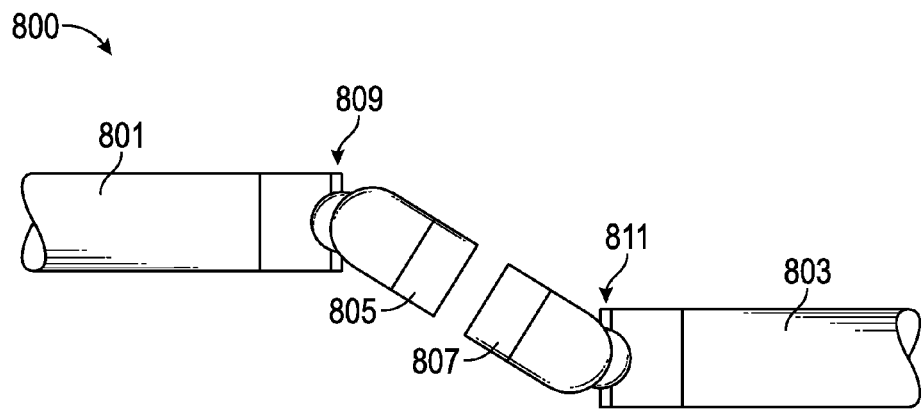
FIG. 8 is an illustration of a magnetic coupling allowing for flexure and/or misalignment between components according to one embodiment.

Referring now to FIG. 8, in some embodiments, vehicle drivetrain 100 includes magnetic coupling 800. Magnetic coupling 800 allows for flexure between first portion 801 and second portion 803 of a shaft. For example, magnetic coupling 800 may be included in drive shaft 103 and/or half shaft 107. Magnetic coupling 800 may perform the functions described herein with reference to coupling 113.

In some embodiments, magnetic coupling 800 includes magnet(s) 805 associated with first portion 801. Magnet(s) 805 are coupled to first portion 801 by connection 809. Connection 809 allows magnet(s) 805 to move off center from first portion 801. Magnetic coupling 800 further includes magnet(s) 807 associated with second portion 803 and coupled to second portion 803 by connection 811. The magnetic fields and/or forces of magnet(s) 805 and magnet(s) 807 enable coupling 800 to impart rotation from first portion 801 to second portion 803. Connections 809 and 811 along with magnet(s) 805 and magnets(s) 807 allow for first portion 801 and second portion 803 to move relative to one another (e.g., due to suspension travel).

In alternative embodiments, magnetic coupling 800 has various other configurations. For example, magnetic coupling 800 may not include connections 809 and/or 811. Instead, magnet(s) 805 and/or magnet(s) 807 may be fixed to first portion 801 and second portion 803. Magnet(s) 805 and magnet(s) 807 may be configured to allow for movement of first portion 801 and/or second portion 803 relative to one another while still imparting rotation from first portion 801 to second portion 803.

Figure 9:
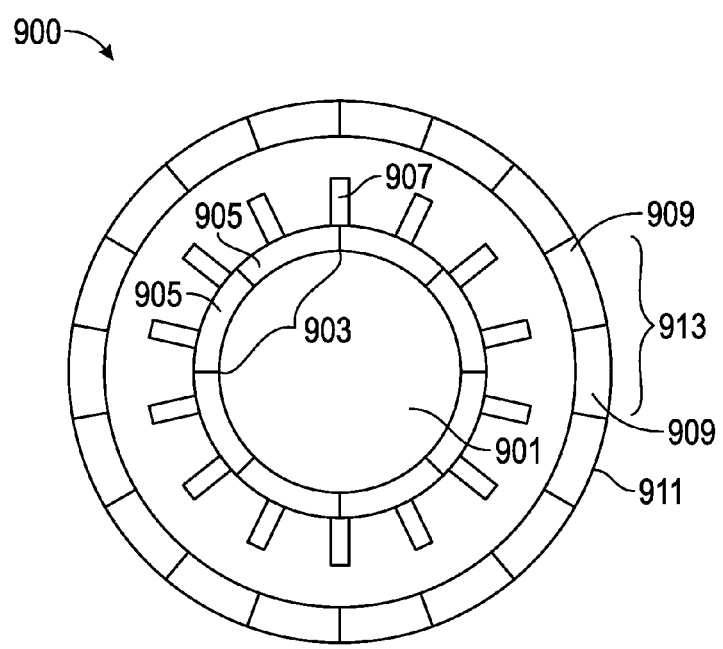
FIG. 9 is an illustration of magnetic reduction gearing according to one embodiment.

Referring now to FIG. 9, vehicle drivetrain 100 includes magnetic reduction gearing 900 in some embodiments. Magnetic reduction gearing 900 takes an input rotation and provides an output rotation which has a lower rotational speed and/or greater torque. Advantageously, magnetic reduction gearing 900 reduces the rotational speed of the input without physical contact between components (e.g., as in mechanical reduction gearing). This may reduce friction loses, reduce maintenance, and/or increase the life span of magnetic reduction gearing 900 in comparison to mechanical reduction gearing.

In some embodiments, magnetic reduction gearing is located within wheel 109 and/or within wheel hub assembly 209. In alternative embodiments, magnetic reduction gearing 900 is located outside of wheel 109 and/or wheel hub assembly 209.

In some embodiments, magnetic reduction gearing 900 receives rotation via input rotor 901. Input rotor 901 may be coupled to or otherwise driven by a shaft (e.g., shaft 301, drive shaft 103, half shaft 107, and/or another shaft). Input rotor 901 includes pairs 903 of magnets 905 having opposite polarities. For example, pairs 903 of magnets 905 may be opposite pole permanent magnets. In some embodiments, input rotor 901 further includes pole pieces 907. Pole pieces 907 direct the magnetic fields produced by magnets 905 included in input rotor 901.

The magnetic fields produced by magnets 905 and/or pole pieces 907 of input rotor 901 interact with magnetic fields produced by magnets 909 of output rotor 911. This interaction causes output rotor 911 to rotate in response to rotation of input rotor 901.

Output rotor 911 includes magnets 909 in pairs 913, with each pair 913 including magnets 909 with opposite polarity. The difference in the number of pairs 903 of magnets 905 and the number of pairs 913 of magnets 909 determines the speed reduction between input rotor 901 and output rotor 911. To reduce the rotational speed, output rotor 911 includes a larger number of pairs 913. For example, input rotor 901 may include four pairs 903 and output rotor 911 includes ten pairs 913. This results in a gear ratio of 2.5 with every 2.5 rotations of input rotor 901 resulting in a single rotation of output rotor 911. Output rotor 911 may be coupled to wheel 109, wheel hub assembly 209, a portion of a shaft, and/or other component of vehicle drivetrain 100. In some embodiments, input rotor 901 will slip relative to output rotor 911 in the event of a torque overload condition. Advantageously, this may protect components of vehicle drivetrain 100 from being overloaded. Magnetic reduction gearing 900 may function both to reduce the rotational speed from an input (e.g., shaft 301 driven by motor 101) and prevent over torqueing of components. In some further embodiments, magnetic reduction gearing 900 further functions as magnetic coupling 700 and allows for translation between components. Input rotor 901 and output rotor 911 may move relative to one another along the axis of rotation.

Figure 10:
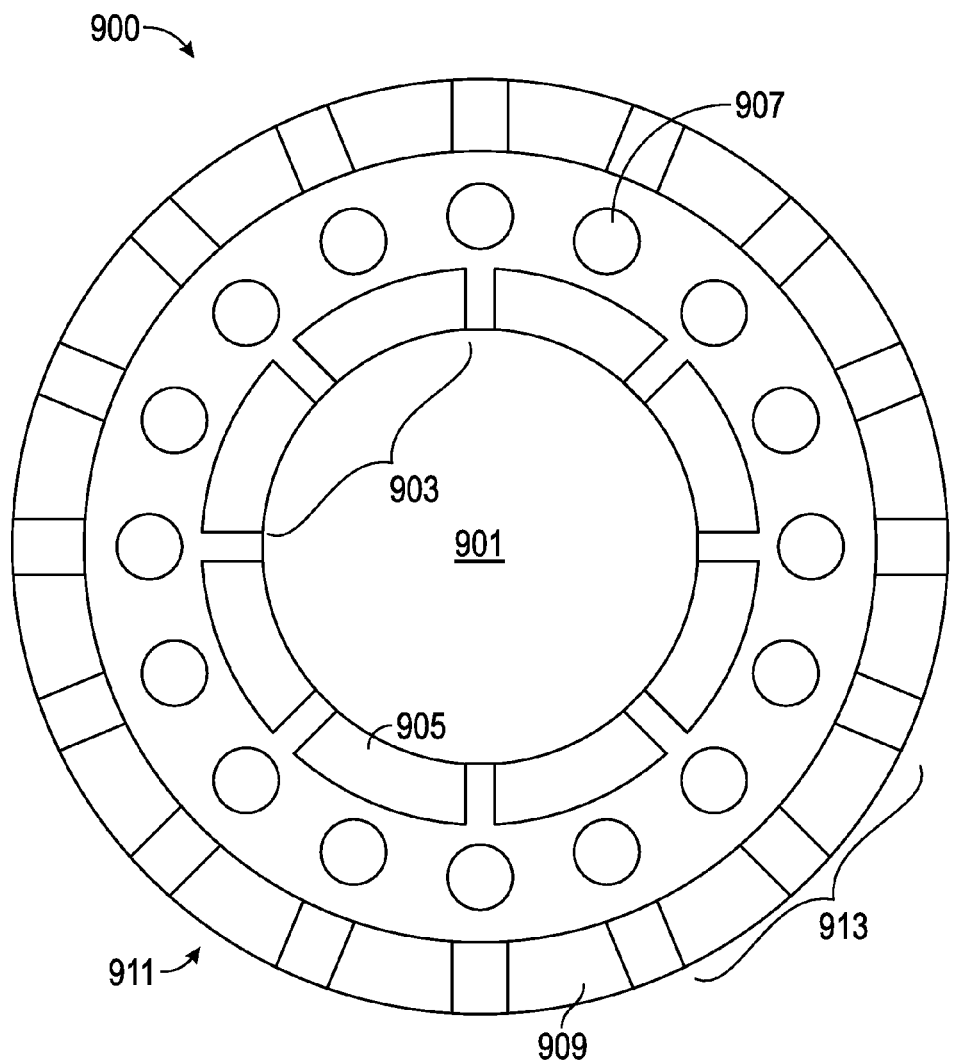
FIG. 10 is an illustration of magnetic reduction gearing according to one embodiment.

Referring now to FIG. 10, in some embodiments, magnetic reduction gearing 900 is a beat harmonic system. Output rotor 911 and input rotor 901 include a plurality of magnets 909 and 905. These rotors rotate relative to pole pieces 907. In one embodiment, pole pieces 907 are steel bars. In other embodiments, pole pieces 907 are made of other materials and/or have other configurations. Input rotor 901 has a first number of cycles of magnets 905 between pole pieces 907 and output rotor 911 has a second number of cycles of magnets 909 between pole pieces 907. The difference in the number of cycles causes a speed reduction between the rotation of input rotor 901 and output rotor 911. In some embodiments, pole pieces 907 are stationary with magnets 905 and magnets 909 of input rotor 901 and output rotor 911 rotating in relation to pole pieces 907. The difference in the number of pairs 913 and pairs 903 of magnets passing pole pieces 907 in a full turn of output rotor 911 and input rotor 901 causes a speed reduction. For example, input rotor 901 may include four pairs 903 of magnets 905, each pair having two magnets 905 with different orientations. Output rotor 911 may have eight pairs 913, each pair having two magnets 909 with different orientations. This results in a gear ratio of 2:1 with each rotation of input rotor 901 resulting in half a rotation of output rotor 911. Thus the number of cycles of pairs 913 and pairs 903 which pass pole pieces 907 for each rotation of output rotor 911 and input rotor 901 determines the gear ratio of magnetic reduction gearing 900. The numbers of magnets 909 and/or 905 may be changed to provide different gear ratios. High gear ratios can be used to provide high torque output and high reduction in rotational speed.

In further embodiments, pole pieces 907 rotate as an additional ring. All the pole pieces 907 may be fixed together (e.g., housed in a ring between input rotor 901 and output rotor 911). The ring of pole pieces 907 may rotate relative to input rotor 901 and/or output rotor 911. Pole pieces 907 may rotate at variable speeds. The speed may be the same as one of input rotor 901 and output rotor 911. The speed may be different from that of input rotor 901 and output rotor 911. Rotating pole pieces 907 may alter the number of cycles of magnets 905 and/or magnets 909 passing pole pieces 907. Therefore, changing the speed of rotation of pole pieces 907 changes the gear ratio between input rotor 901 and output rotor 913. The speed of rotation of pole pieces 907 may be controlled (e.g., by control circuit 319 or another control circuit) to control the amount of speed reduction and/or the resulting torque.

In further embodiments, the output shaft of magnetic reduction gearing 900 is fixed to pole pieces 907. Pole pieces 907 and the output shaft rotate as input rotor 901 and magnets 905 rotate. Output rotor 911 and magnets 909 are fixed in this embodiment. Pole pieces 907 modify the magnetic field produced by magnets 909 of fixed output rotor 911 to create a modified magnetic field with two north and two south poles. In other embodiments, other numbers of poles are created. These poles created by pole pieces 907 are engaged by a magnetic field produced by magnets 905 of input rotor 901. Input rotor 901 and the magnetic field produced thereby drives pole pieces 907 and the output shaft coupled to pole pieces 907.

In alternative embodiments, vehicle drivetrain 100 includes independent magnetic shear devices and/or magnetic clutches which prevent overloading of components of vehicle drivetrain 100. In further embodiments, vehicle drivetrain 100 includes mechanical components which prevent overload conditions. For example, vehicle drivetrain 100 may include mechanical clutches.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A vehicle drivetrain, comprising:
    a motor configured to provide a rotational driving force;
    a shaft configured to receive the rotational driving force from the motor;
    a magnetic bearing configured to selectively support the shaft;
    a mechanical bearing configured to selectively support the shaft; and
    a control mechanism configured to transition support of the shaft between the mechanical bearing and the magnetic bearing by controlling a magnetic system structured to move at least one of the shaft and the mechanical bearing between a first position where the shaft is supported by the mechanical bearing when the control mechanism detects that a vehicle speed is below a threshold and a second position where the shaft is not supported by the mechanical bearing when the control mechanism detects that the vehicle speed is equal to or greater than the threshold.

2. The vehicle drivetrain of claim 1, wherein the magnetic bearing is a passive magnetic bearing.

3. The vehicle drivetrain of claim 2, wherein the passive magnetic bearing comprises electromagnets having a variable field not actively controlled.

4. The vehicle drivetrain of claim 1, wherein the magnetic bearing is a hybrid bearing comprising both passive and active bearing elements.

5. The vehicle drivetrain of claim 1, wherein the magnetic bearing is an active magnetic bearing including electromagnets configured to interact with the shaft.

6. The vehicle drivetrain of claim 1, wherein the magnetic bearing is a hybrid magnetic bearing including both permanent magnets and electromagnets.

7. The vehicle drivetrain of claim 1, wherein the shaft includes at least one spline section configured to interface with a component driven by the shaft, and wherein the splines are configured to allow for the shaft to move relative to the mechanical bearing.

8. The vehicle drivetrain of claim 1, wherein a component driven by the shaft is at least one of a wheel hub assembly, a differential, a coupling, or a second shaft.

9. The vehicle drivetrain of claim 1, further comprising:
    magnetic reduction gearing at a wheel of the vehicle and configured to reduce an input rotational speed from the shaft to an output rotational speed.

10. The vehicle drivetrain of claim 1, wherein the threshold further includes a shaft rotation rate, a power availability, or a vibration level.

11. The vehicle drivetrain of claim 1, wherein the mechanical bearing is included within the magnetic bearing.

12. The vehicle drivetrain of claim 1, wherein the shaft includes a tapered flange portion having at least one diameter larger than a second diameter of the shaft, the shaft configured to engage with the mechanical bearing when the tapered flange portion is inserted within the mechanical bearing.

13. The vehicle drivetrain of claim 1, wherein the control mechanism is further configured to transition support of the shaft from the magnetic bearing to the mechanical bearing based on determining that the threshold condition is no longer satisfied.

14. The vehicle drivetrain of claim 1, wherein the magnetic system produces a first magnetic field that moves at least one of the shaft and the mechanical bearing to the first position, and a second magnetic field that moves at least one of the shaft and the mechanical bearing to the second position.

15. The vehicle drivetrain of claim 1, wherein the shaft includes a plate, and wherein the magnetic system includes an electromagnet that produces a first magnetic field that attracts the plate and moves the shaft to the first position, and a second magnetic field that repulses the plate and moves the shaft to the second position.

16. A vehicle drivetrain, comprising:
a shaft configured to receive a rotational driving force;
a magnetic bearing configured to selectively support the shaft;
a mechanical bearing configured to selectively support the shaft;
a magnetic system structured to move at least one of the shaft and the mechanical bearing between a first position where the shaft is supported by the mechanical bearing and a second position where the shaft is not supported by the mechanical bearing via a reaction force caused by a magnetic field produced by the magnetic system; and
a control mechanism controlling the magnetic system to transition support of the shaft between the mechanical bearing and the magnetic bearing based on a threshold condition including a vehicle speed.

17. The vehicle drivetrain of claim 16, wherein the threshold condition is at least one of a shaft rotation rate, a power availability, or a vibration level.

18. The vehicle drivetrain of claim 16, wherein the control mechanism controls the magnetic system to transition support of the shaft from the magnetic bearing to the mechanical bearing based on determining that the threshold condition is no longer satisfied.

19. The vehicle drivetrain of claim 16, wherein the magnetic system produces a first magnetic field that moves at least one of the shaft and the mechanical bearing to the first position, and a second magnetic field that moves at least one of the shaft and the mechanical bearing to the second position.

* * * * *